(12) United States Patent
Sandgren et al.

(10) Patent No.: US 11,700,287 B2
(45) Date of Patent: *Jul. 11, 2023

(54) SNAP-IN INVOCATION FOR CALL RECONSTRUCTION

(71) Applicant: Avaya Management L.P., Durham, NC (US)

(72) Inventors: Thorsten Ohrstrom Sandgren, Thornton, CO (US); Amit Mishra, Broomfield, CO (US)

(73) Assignee: Avaya Management L.P., Durham, NC (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/859,497

(22) Filed: Apr. 27, 2020

(65) Prior Publication Data

US 2020/0259875 A1    Aug. 13, 2020

Related U.S. Application Data

(63) Continuation of application No. 15/284,125, filed on Oct. 3, 2016, now Pat. No. 10,742,692, which is a
(Continued)

(51) Int. Cl.
*H04L 65/1069*   (2022.01)
*H04L 65/403*   (2022.01)
(Continued)

(52) U.S. Cl.
CPC ...... *H04L 65/1069* (2013.01); *H04L 65/1045* (2022.05); *H04L 65/1046* (2013.01); *H04L 65/1104* (2022.05); *H04L 65/403* (2013.01)

(58) Field of Classification Search
CPC ............ H04L 65/1069; H04L 65/1006; H04L 65/1046; H04L 65/105; H04L 65/403
(Continued)

(56) References Cited

U.S. PATENT DOCUMENTS 6,992,974 B1   1/2006   Tripathi
7,417,988 B1   8/2008   Tripathi et al.
(Continued)

FOREIGN PATENT DOCUMENTS

EP   2667563   11/2013
EP   2680525   1/2014

OTHER PUBLICATIONS

U.S. Appl. No. 15/284,125, filed Oct. 3, 2016.
(Continued)

*Primary Examiner* — David R Lazaro
*Assistant Examiner* — Mariegeorges A Henry
(74) *Attorney, Agent, or Firm* — Sheridan Ross P.C.

(57) ABSTRACT

During a Session Initiation Protocol dialog setup, a media gateway or container executes or initiates two or more applications that provide features during a conference call. The applications are applied to messages or data in the conference call based on a sequence order established during the setup of the conference call. The sequence order and the application identities are stored in a shared database. When a failure occurs during the conference call, the applications are reestablished in the reconstructed or reestablished conference call. The application reconstruction includes reinitiating the applications with the same sequence as previously established before the failure. As such, the user has the same features applied in the same way before and after the failure, which improves the systems performance and expected operation.

20 Claims, 14 Drawing Sheets

Related U.S. Application Data continuation-in-part of application No. 14/802,015, filed on Jul. 17, 2015, now Pat. No. 10,601,880, and a continuation-in-part of application No. 13/570,528, filed on Aug. 9, 2012, now Pat. No. 9,344,460.

(51) Int. Cl.
  *H04L 65/1046* (2022.01)
  *H04L 65/1045* (2022.01)
  *H04L 65/1104* (2022.01)

(58) Field of Classification Search
  USPC ................................ 709/204, 217, 225, 227
  See application file for complete search history.

(56) References Cited

U.S. PATENT DOCUMENTS

| | | | |
|---|---|---|---|
| 7,916,855 | B2 | 3/2011 | Caballero-McCann et al. |
| 8,179,912 | B2 | 5/2012 | Cosmadopoulos et al. |
| 8,363,812 | B1 | 1/2013 | Robbins |
| 8,495,231 | B1 | 7/2013 | Katapadi et al. |
| 9,025,438 | B1 | 5/2015 | Palmer et al. |
| 9,116,772 | B2 | 8/2015 | Ohrstrom-Sandgren et al. |
| 9,185,140 | B2 | 11/2015 | Nemani et al. |
| 9,344,460 | B2 | 5/2016 | Haserodt et al. |
| 2005/0286466 | A1 | 12/2005 | Tagg et al. |
| 2006/0036747 | A1 | 2/2006 | Galvin, Jr. et al. |
| 2006/0142010 | A1 | 6/2006 | Tom et al. |
| 2006/0146798 | A1 | 7/2006 | Harton et al. |
| 2006/0153064 | A1* | 7/2006 | Caballero-McCann ..................... H04L 67/14 370/216 |
| 2006/0270447 | A1 | 11/2006 | Everson et al. |
| 2006/0276192 | A1 | 12/2006 | Dutta et al. |
| 2006/0294245 | A1 | 12/2006 | Raguparan et al. |
| 2007/0201480 | A1 | 8/2007 | Bao et al. |
| 2007/0232284 | A1 | 10/2007 | Mason et al. |
| 2007/0281681 | A1 | 12/2007 | Holm |
| 2008/0013447 | A1 | 1/2008 | Lauber |
| 2008/0037447 | A1 | 2/2008 | Garg et al. |
| 2008/0069011 | A1 | 3/2008 | Sekaran et al. |
| 2008/0098117 | A1 | 4/2008 | Fukuhara et al. |
| 2008/0137531 | A1 | 6/2008 | Tal-Aviv et al. |
| 2008/0155310 | A1 | 6/2008 | Langen et al. |
| 2008/0240091 | A1 | 10/2008 | Kesavan et al. |
| 2008/0248763 | A1 | 10/2008 | Park et al. |
| 2008/0253363 | A1 | 10/2008 | Altberg et al. |
| 2008/0316976 | A1 | 12/2008 | Thompson et al. |
| 2009/0019158 | A1* | 1/2009 | Langen ............... H04L 67/1002 709/226 |
| 2009/0119389 | A1 | 5/2009 | Mu et al. |
| 2009/0177785 | A1 | 7/2009 | Reid et al. |
| 2009/0238358 | A1 | 9/2009 | Ramanathan et al. |
| 2009/0285175 | A1 | 11/2009 | Nix |
| 2010/0009674 | A1 | 1/2010 | Sapkota et al. |
| 2010/0034367 | A1 | 2/2010 | Das et al. |
| 2010/0118742 | A1 | 5/2010 | Ezell |
| 2010/0142411 | A1 | 6/2010 | Holm et al. |
| 2010/0165889 | A1 | 7/2010 | Madabhushi et al. |
| 2010/0316048 | A1 | 12/2010 | Reyes et al. |
| 2011/0090899 | A1 | 4/2011 | Fedorov |
| 2011/0122863 | A1 | 5/2011 | Balasaygun |
| 2011/0249073 | A1 | 10/2011 | Cranfill et al. |
| 2011/0273526 | A1 | 11/2011 | Mehin et al. |
| 2011/0286365 | A1 | 11/2011 | Simoes et al. |
| 2011/0320525 | A1 | 12/2011 | Agarwal et al. |
| 2012/0033661 | A1 | 2/2012 | Knappe |
| 2012/0069983 | A1 | 3/2012 | Sall |
| 2012/0072783 | A1 | 3/2012 | Li et al. |
| 2012/0089680 | A1 | 4/2012 | Ono et al. |
| 2012/0243673 | A1 | 9/2012 | Carr et al. |
| 2012/0258712 | A1 | 10/2012 | Rozinov |
| 2012/0320736 | A1 | 12/2012 | Hillier et al. |
| 2013/0054698 | A1 | 2/2013 | Lee et al. |
| 2013/0077539 | A1 | 3/2013 | Averill et al. |
| 2013/0189967 | A1* | 7/2013 | Ritter ................... H04W 76/19 455/424 |
| 2013/0212242 | A1 | 8/2013 | Mendiratta |
| 2013/0268511 | A1 | 10/2013 | Bailey et al. |
| 2013/0288671 | A1 | 10/2013 | Keller et al. |
| 2013/0311825 | A1 | 11/2013 | Brunson et al. |
| 2013/0346789 | A1 | 12/2013 | Brunel et al. |
| 2014/0089915 | A1 | 3/2014 | Haserodt et al. |
| 2014/0095723 | A1 | 4/2014 | Ezell et al. |
| 2014/0101322 | A1 | 4/2014 | Nissim et al. |
| 2014/0185492 | A1 | 7/2014 | Liu et al. |
| 2014/0269446 | A1 | 9/2014 | Lum et al. |
| 2014/0280720 | A1 | 9/2014 | Bischoff et al. |
| 2015/0106528 | A1 | 4/2015 | Somes et al. |
| 2015/0188727 | A1 | 7/2015 | Bruner et al. |
| 2015/0334241 | A1 | 11/2015 | Noldus |
| 2015/0358171 | A1 | 12/2015 | Rosenberg |
| 2016/0006819 | A1 | 1/2016 | Tarricone |
| 2016/0112475 | A1 | 4/2016 | Lawson et al. |
| 2016/0149966 | A1 | 5/2016 | Remash et al. |
| 2016/0212074 | A1 | 7/2016 | Yu et al. |
| 2016/0366189 | A1 | 12/2016 | Hart et al. |
| 2017/0019437 | A1 | 1/2017 | Phadnis et al. |
| 2017/0026424 | A1 | 1/2017 | Sandgren et al. |
| 2017/0034223 | A1* | 2/2017 | Arscott ............... H04L 65/1046 |
| 2017/0094024 | A1 | 3/2017 | Braudes et al. |
| 2017/0099323 | A1 | 4/2017 | Sandgren |

OTHER PUBLICATIONS

U.S. Appl. No. 13/570,528, filed Aug. 9, 2012 now U.S. Pat. No. 9,344,460.

U.S. Appl. No. 14/802,015, filed Jul. 17, 2015 now U.S. Pat. No. 10,601,880.

Kistijantoro et al. "Component Replication in Distributed Systems: a Case study using Enterprise Java Beans," Proceedings of the 22nd International Symposium on Reliable Distributed Systems, Oct. 2003, pp. 89-98, obtained from [citeseerx.ist.psu.edu/viewdoc/download?doi=10.1.1.2.530&rep=rep1&type=pdf].

Niemi "Session Initiation Protocol (SIP) Extension for Event State Publication," Network Working Group, Oct. 2004, RFC 3903, pp. 1-32.

Rosenberg et al. "SIP: Session Initiation Protocol," Network Working Group, Jun. 2002, RFC 3261, pp. 1-269.

Official Action with English Translation for German Patent Application No. 102013212251.9, dated May 4, 2016 11 pages.

Search Report for United Kingdom Patent Application No. GB1311098.6, dated Dec. 16, 2013 8 pages.

Search and Examination Report for United Kingdom Patent Application No. GB1311098.6, dated Nov. 3, 2014, 5 pages.

Notice of Allowance for United Kingdom Patent Application No. GB1311098.6, dated Apr. 21, 2015 2 pages.

Official Action for United Kingdom Patent Application No. GB1423093.2, dated Jan. 26, 2015 5 pages.

Official Action for India Patent Application No. 2200/MUM/2013, dated May 30, 2019 6 pages.

Official Action with English Translation Korea Patent Application No. 2013-0075603, dated Jun. 2, 2014 4 pages.

Notice of Allowance with English Translation for Korea Patent Application No. 2013-0075603, dated Nov. 26, 2014 3 pages.

Official Action for U.S. Appl. No. 13/570,528, dated Jan. 30, 2015 16 pages.

Official Action for U.S. Appl. No. 13/570,528, dated Aug. 13, 2015 17 pages.

Notice of Allowance for U.S. Appl. No. 13/570,528, dated Jan. 13, 2016 10 pages.

Official Action for U.S. Appl. No. 14/802,015, dated Jul. 5, 2017 17 pages.

Official Action for U.S. Appl. No. 14/802,015, dated Mar. 8, 2018 15 pages.

Official Action for U.S. Appl. No. 14/802,015, dated Dec. 28, 2018 13 pages.

(56) References Cited

OTHER PUBLICATIONS

Notice of Allowance for U.S. Appl. No. 14/802,015, dated Jun. 12, 2019 9 pages.
Official Action for U.S. Appl. No. 15/284,125, dated Dec. 14, 2018 13 pages.
Official Action for U.S. Appl. No. 15/284,125, dated Aug. 12, 2019 15 pages.
Notice of Allowance for U.S. Appl. No. 15/284,125, dated Jan. 30, 2020 8 pages.

* cited by examiner

SNAP-IN INVOCATION FOR CALL RECONSTRUCTION

CROSS REFERENCE TO RELATED APPLICATIONS

This application is a Continuation Application of and claims priority to U.S. patent application Ser. No. 15/284,125, entitled "SNAP-IN INVOCATION FOR CALL RECONSTRUCTION", filed on Oct. 3, 2016, which is a Continuation-in-Part (CIP) Application of and claims priority to U.S. patent application Ser. No. 14/802,015, entitled "CONFERENCE RECONSTRUCTION IN SIP NETWORKS," filed on Jul. 17, 2015, and U.S. patent application Ser. No. 13/570,528, entitled "HIGH AVAILABILITY SESSION RECONSTRUCTIONS," filed on Aug. 9, 2012; each of these Applications are incorporated herein by reference for all that they teach and for all purposes.

FIELD OF THE INVENTION

The systems and methods relate to reconstructing a conference call and in particular preserving and reconstructing a state of a conference call after call data is lost.

BACKGROUND

Voice over Internet Protocol (VoIP) systems employ session control protocols, such as the Session Initiation Protocol (SIP), to control the set-up, modification, and tear-down of calls as well as the selection of audio and video codecs, which encode speech and video allowing transmission over an IP network as digital audio and video via one or more media streams. The advantage to VoIP is that a single network can be utilized to transmit data packets as well as voice and video packets between users, thereby greatly simplifying communications. SIP is an open signaling protocol for establishing many kinds of real-time and near-real-time communication sessions, which may also be referred to as dialogs. Examples of the types of communication sessions that may be established using SIP include voice, video, and/or instant messaging. These communication sessions may be carried out on any type of communication device such as a personal computer, laptop computer, telephone, cellular phone, Personal Digital Assistant, etc. One key feature of SIP is its ability to use an end-user's Address of Record (AOR) as a single unifying public address for all communications. Thus, in a world of SIP-based communications, a user's AOR becomes their single address that links the user to all of the communication devices associated with the user. Using this AOR, a caller can reach any one of the user's communication devices, also referred to as SIP User Agents (UAs), without having to know each of the unique device addresses or phone numbers.

That is, SIP supports the initiation, modification, and termination of media sessions between SIP UAs. These sessions are managed by SIP dialogs, which represent a SIP relationship between a pair of user agents. Because dialogs are between pairs of SIP UAs, SIP's usage for two-party communications (such as a phone call) is obvious. Communications sessions with multiple participants, however, are more complicated. SIP can support many models of multi-party communications. One, referred to as loosely coupled conferences, makes use of multicast media groups. In the loosely coupled model, there is no signaling relationship between participants in the conference and there is no central point of control or conference server.

In another model, sometimes referred to as the tightly coupled conference, there is a central point of control. Each participant connects to this central point. The central point provides a variety of conference functions and may possibly perform media mixing functions as well. Tightly coupled conferences are not directly addressed by RFC 3261, although basic participation is possible without any additional protocol support. Currently, when a conference call is established between SIP User Agents, the conference is controlled by an entity that would act as a Conference Controller. The media for the conference call generally flows through one or more Media Gateways, which are controlled by the Conference Controller utilizing a media control protocol like H.248/Megaco or MSML.

If the Conference Controller restarts or experiences a service interruption due to some event, such as a power failure or other catastrophic event, the media path between one or more of the SIP User Agents and the Media Gateway may be maintained, but the call dialog, e.g. signaling paths, is never reestablished. That is, the call may stay in a connection preservation mode where the media is available but the signal pathways are not. Accordingly, features, especially those associated with applications executed for the communication, such as adding a new participant, transferring calls, and placing a call on hold for example, will not work using the existing media path while in the connection preservation mode.

SUMMARY

It is with respect to the above issues and other problems that the embodiments presented herein were contemplated. That is, in accordance with embodiments of the present disclosure, systems and methods are presented for reconstructing a signaling path between a user agent and a conference controller following a conference or a conference controller restart. Currently, when there is a conference call established between SIP UAs, the conference is controlled by an entity that would act as a conference controller, for example a Communication Manager or Avaya Aura Conferencing. The media for the conference flows through either one or more media gateways, which are controlled by the conference controller using a media control protocol like H.248/Megaco or MSML, for example. If the conference controller restarts due to some catastrophic event, then currently the following set of events occur: (i) all of the call dialog information on the conference controller is lost; (ii) once the conference controller comes back up, the media gateways register back to the conference controller and the call context information for all the calls on that media gateway are provided to the conference controller. However, the media path in the conference call is maintained but the call is never re-established. That is, the call stays in a connection preservation mode for example. Accordingly, features like adding a new participant, transferring a participant, and placing a participant on hold, etc. will not work in the conference call anymore.

Accordingly, and in accordance with embodiments of the present disclosure, when a conference call is established, the conference controller sends a Unique Session ID (this could be the SIP Global Session ID) per ephemeral (per-SIP UA) to the media gateway, along with a Unique Conference ID for the whole Conference. Therefore, if the call is on multiple media gateways (with an Inter Gateway Connection between them), then the same Unique Conference ID is sent to all the terminations on each of those media gateways.

Now, if the conference controller restarts due to a catastrophic event, then all the call data is lost on the controller and the media gateways during re-registration will send all the contexts with the Unique Conference and Session IDs to the conference controller. In addition to sending the Unique Session ID and the Unique Conference ID to the media gateway, the conference controller may also send other feature and/or policy information to the media gateway. Examples of other feature and/or policy information include, but are not limited to, previously executing applications, application sequencing, feature states, and/or button states. Accordingly, following a conference controller restart or other catastrophic failure, the media gateway may provide such additional feature and policy information to the conference controller. Upon receiving such additional information, the conference controller may recover such features, applications, and/or policy states.

Following the transfer of such information, the conference controller sends an Out-of-Dialog REFER, which can also be referred to as an OOD-REFER, to each of the conference participants. The Out-of-Dialog REFER contains R-URI, which is the Unique Conference ID, and a separate header for the Unique Session ID for that specific SIP UA (received from the media gateway). The SIP UA upon receiving the Out-of-Dialog REFER identifies that the OOD-REFER is for call reconstruction (denoted by a tag in R-URI), and using the Unique Session ID, the SIP UA identifies the call on itself that has to be reconstructed. That is, the SIP UA identifies the call from the call state information based on the Unique Session ID. The SIP UA then sends a new INVITE message to the R-URI it received with its media parameters and the conference controller upon receiving the INVITE from the SIP UA identifies the ephemeral it is associated to and links them together. The conference controller can also reinitiate any applications executed in the previous call. Accordingly, the SIP UA, after receiving the 200-OK response from the conference controller, drops the old call with a BYE. The conference controller then repeats this set of actions for all the SIP UAs in the conference call.

In accordance with at least some embodiments of the present disclosure, a method of managing a Session Initiation Protocol (SIP) dialog between a network element and a conference controller is provided. The method may include determining that a signaling-disrupting event has occurred during a SIP conference call, and reestablishing the SIP dialog between the network element and the conference controller.

In accordance with at least some embodiment of the present disclosure, a system is provided, the system comprising: a conference controller including: a processor; and memory including one or more instructions that when executed by the processor, enable the conference controller to: determine that a signaling-disrupting event has occurred during a Session Initiation Protocol (SIP) conference call; and reestablish a SIP dialog between a network element and the conference controller.

Further yet, and in accordance with at least some embodiment of the present discourse, a computer readable medium having stored thereon instructions that cause a processor to execute a method is provided, the method comprising one or more instructions to establish a Session Initiation Protocol (SIP) dialog between a SIP user agent and a conference controller; one or more instructions to determine that a signaling-disrupting event has occurred during a SIP conference call having the established SIP dialog; and one or more instructions to reestablish the SIP dialog between the SIP user agent and the conference controller.

Accordingly, it is these and other advantages that will be apparent from the disclosure.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

Figure 1:
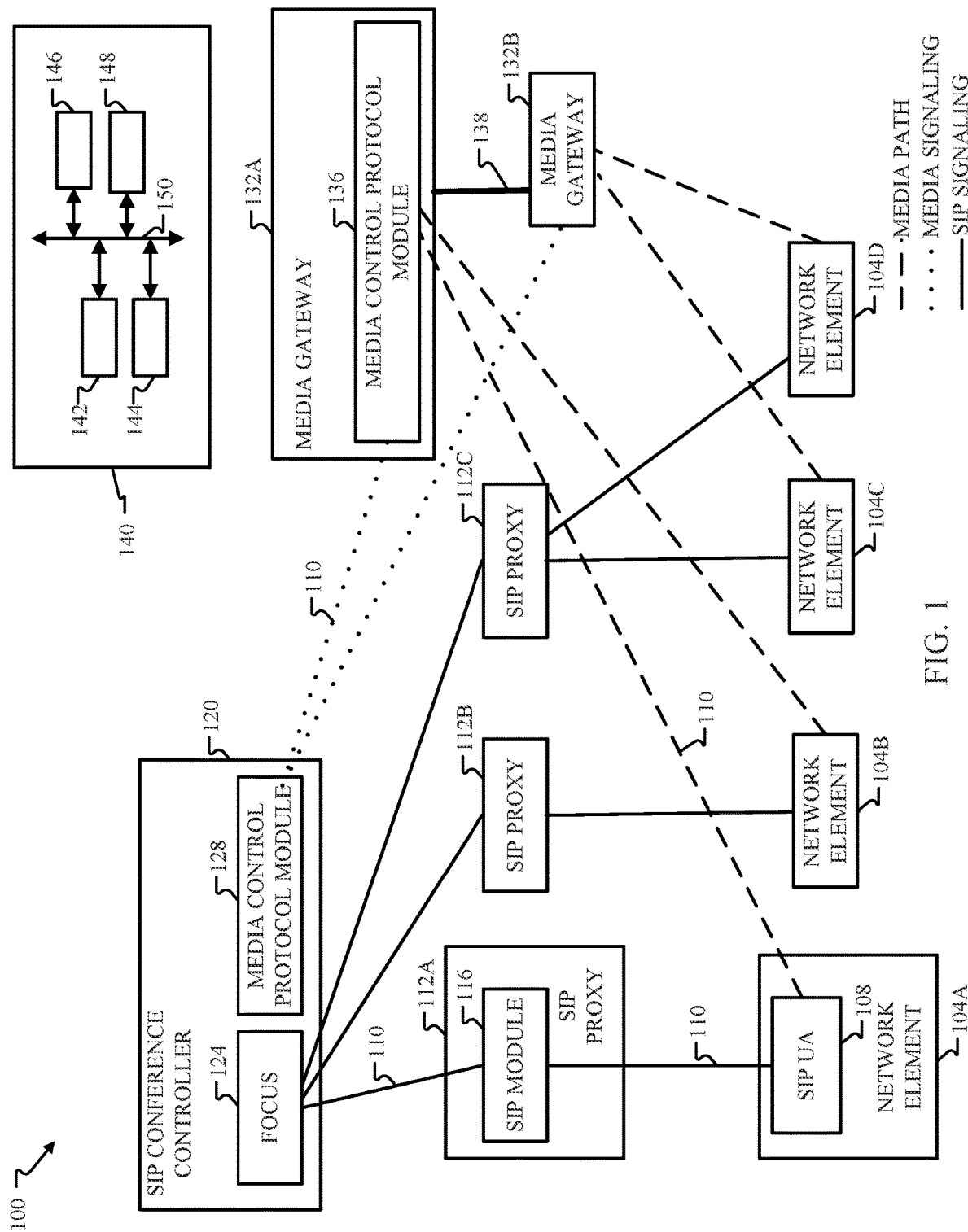
FIG. 1 depicts an embodiment of a first communication system for reconstructing a Session Initiation Protocol (SIP) dialog in accordance.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The disclosure herein is illustrated below in conjunction with an exemplary communication system. Although well suited for use with a system using a server(s) and/or database(s), for example, the embodiments of the disclosure are not limited to a use with any particular type of communication system or configuration of system elements. Those skilled in the art will recognize that the disclosed techniques may be used in any communication application in which it is desirable to reconstruct a Session Initiation Protocol (SIP) dialog.

The exemplary systems and methods of this invention will also be described in relation to analysis software, modules, and associated analysis hardware. However, to avoid unnecessarily obscuring the present invention, the following description omits well-known structures, components, and devices that may be shown in block diagram form or are otherwise summarized.

In Session Initiation Protocol (SIP), a dialog for communication is set up as a session. Signaling to establish the session may use a SIP proxy server. Once the session is set up, a media session may be created directly between users' SIP devices. Once a call is established by the SIP proxy server, a voice call can be set up. In addition to call setup, SIP messages can be used to invoke one or more snap-ins on either side of a session, which are associated with the users in the session. A snap-in is a small piece of software that can be added as a modular component to support other applications. When more than one snap-in is invoked, the snap-ins are typically invoked or applied in a certain, predetermined order. During an application sequence, snap-ins are invoked when the user receives a call, makes a call, or both. If the SIP proxy server experiences a failure during a session, either during setup of a call or for an established call, call reconstruction may be required. It is critical that the original snap-in invocation order is preserved after a reconstruction. The order can preserve feature interaction and operation as expected by the system and the user.

FIG. 1 depicts an illustrative communication system 100 for reconstructing a Session Initiation Protocol (SIP) dialog in accordance with at least some embodiments of the present disclosure. The system 100 includes one or more network elements 104A-104D, one or more SIP proxies 112A-112C, at least one SIP server 120, and one or more media gateways 132A-132B. Each of the one or more network elements 104A-104D, one or more SIP proxies 112A-112C, at least one SIP server 120, and one or more media gateways 132A-132B may be the same as or similar to node 140 that typically includes a processor 142, memory 144, an input/output (I/O) subsystem 146, and one or more hardware units/modules 148 coupled to a system bus 150. Of course, in embodiments where components may share the same physical hardware, each of the one or more network elements 104A-104D, one or more SIP proxies 112A-112C, at least one SIP server 120, and one or more media gateways 132A-132B may rely on a processor 142 (e.g., a microprocessor), computer memory 144, an input/output (I/O) subsystem 146, and one or more hardware units/modules 148.

Each of the network elements 104 may include but are not limited to, end-user devices (e.g., phones, cell phones, mobile communication devices, soft-client applications running on a Personal Computer (PC) or similar type of work station and connected to a phone, etc.) and applications running on a server or the like (e.g., conferencing application(s) running on a conferencing server, messaging application(s) running on a messaging server, voice portal, etc.) and may communicate with at least one of the SIP proxy 112, media gateway 132, and SIP server 120 over one or more networks 810. In accordance with embodiments of the present disclosure, four network elements 104A-104D are illustrated; however, any number of network elements 104 may be connected to the network 810. While certain embodiments of the present invention will be discussed in connection with exemplary network elements, one skilled in the art will appreciate that embodiments of the present invention are not so limited.

Each of the network elements 104A-104D may include a SIP UA 108. The SIP UA 108 may be any hardware/software that can process SIP communications such as a SIP telephone application, a SIP Instant Messaging (IM) application, a SIP video conference application, a SIP email application, a SIP softphone in a PC, a SIP application in a set-top box, and the like. That is, the SIP UA 108 may be a component of the SIP network element 104 that facilitates SIP UA behavior and implements SIP call control features on behalf of the SIP network element 104. In accordance with at least some embodiments of the present invention, the SIP UA 108 is the component of the network element 104 that is capable of exchanging (e.g., generating, receiving, and/or processing) SIP messages with other network elements 104, SIP proxies 112, and/or the SIP server 120. Exemplary SIP messages that may be generated, received, and/or processed by the SIP UA 108 include, without limitation, INVITE, ACK, OK, BYE, and any other known SIP message, such as those described in IETF RFC 3261, the entire contents of which are hereby incorporated herein by reference, and such other IETF RFC's that extend the message functionality of SIP. The SIP UA 108 may communicate with the SIP proxy 112, the SIP server 120, the media gateway 132, and/or another SIP UA 108. Further, the network element 104 may also include a processor 142 for executing instructions stored in memory 144, thereby performing the functions provided by the network element 104 and the SIP UA 108.

The network 810 may be any network that can send and receive information, such as the Internet, a Wide Area Network (WAN), a Local Area Network (LAN), the Public Switched Telephone Network (PSTN), a packet switched network, a circuit switched network, a cellular network, any combination of these, and the like. The network 810 may use a variety of protocols, such as Ethernet, Internet Protocol (IP), Session Initiation Protocol (SIP), Asynchronous Transfer Mode (ATM), Integrated Services Digital Network (ISDN), H.323, and the like.

While SIP UAs 108 may communicate directly without any additional SIP intermediaries, from a practical standpoint SIP servers, such as SIP proxy 112 and SIP conference controller 120, are utilized to facilitate end-to-end communication when utilizing SIP as a public service. A proxy server, as defined by RFC 3261, is an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy interprets and, if necessary, rewrites specific parts of a request message before forwarding it. That is, the SIP proxy 112 may manage the setup of calls between SIP devices, such as network elements 104, including the controlling of call routing. Further, the SIP proxy 112 may perform necessary functions such as registration, authorization, network access control and, in some cases, network security. The SIP proxy 112 may include one or more processors 142 or memories 144 and be distributed across multiple devices on network 810.

The SIP proxy 112 may also include a SIP module 116. The SIP module 116 may be any hardware/software that can process SIP messages. In some embodiments, the SIP module 116 is the SIP proxy server 112. In other embodiments, the SIP module 116 is a Back-to-Back User Agent (B2BUA). In still other embodiments, the SIP module 116 may comprise both a SIP proxy server 112 and a B2BUA. The SIP proxy server 112 and the B2BUA may reside in separate SIP modules 116 that reside on different devices in different networks 810. Although there is only a single SIP module 116 illustrated in FIG. 1, each of the SIP Proxies 112A-112C may include a SIP module 116. The SIP proxy 112 may also include a processor 142 for executing instructions stored in memory 144, thereby performing the functions provided by the SIP proxy 112, and the SIP module 116.

In accordance with embodiments of the present disclosure, the SIP module 116 is configured to establish a SIP dialog between the SIP UA 108 and the SIP conference controller 120 using standard SIP processes. In addition, other SIP UAs 108 may be involved in the SIP dialog. For example, more than two SIP UAs 108 may be involved in a video conference or voice conference utilizing SIP conference controller 120 as a conference server.

As previously discussed, the network element 104 may be participating in a conference where the SIP conference controller 120 manages or otherwise facilitates the conference. That is, the SIP conference server 120 may be a physical server that contains, at a minimum, a focus in accordance with IETF RFC 4353, the entire contents of which are hereby incorporated herein by reference for all that it teaches and for all purposes. In a tightly coupled conference, a single UA, referred to as a focus, such as focus 124, maintains a dialog with each participant in the conference, such as each network element 104 and each SIP proxy 112. The focus 124 plays the role of the centralized manager of the conference, and may be addressed by a conference Uniform Resource Indictor (URI). That is, the focus 124 maintains a SIP signaling relationship with each participant in the conference and is responsible for ensuring, in some way, that each participant receives the media that make up the conference. The focus also implements conference policies.

The SIP conference controller 120 may also include a media control protocol module 128. Such a media control module 128 may be the same as or similar to a media gateway controller that manages call control protocols, or signaling, between the SIP conference controller 120 and the media gateway 132. The SIP conference controller 120, via the media control protocol module 128, may communicate with the media gateway 132 using a media signaling protocol, such as, but not limited to H.248/MEGACO and media server markup language (MSML). The SIP conference controller 120 may also include a processor 142 for executing instructions stored in memory 144, thereby performing the functions provided by the SIP conference controller 120, the focus 124, and the media control protocol module 128.

In accordance with embodiments of the present disclosure, the media gateway 132 may comprise a platform for executing real-time media processing tasks. That is, the media gateway 132 may be a logical function that maps either to a single physical device or to a portion of a physical device and converts media provided in one type of network to the format required in another type of network. Further, the media gateway 132 may be capable of processing audio and video, alone, or in any combination. The media gateway 132 may also play audio/video messages and perform other Interactive Voice Response (IVR) functions, or may perform media conferencing, for example, by providing media to one or more network elements 104 in accordance with one or more protocols, such as Real-time Transport Protocol and/or the RTP Control Protocol (RTCP). Alternatively, or in addition, the media gateway 132 may include a media control protocol module 136 that is different than the media control protocol module 128. That is, the media control protocol module 136 may be responsible for converting media provided in one type of network to the format required in another type of network and for communicating with the media control protocol module 128 and each of the SIP UAs 108 of the respective network elements 104. In some embodiments, multiple media gateways 132A-132B may be connected by an Inner Gateway Connection 138. Like the network element 104, the SIP proxy 112, and the SIP conference controller 120, the media gateway 132 may also include a processor 142 for executing instructions stored in memory 144, thereby performing the functions provided by the media gateway 132 and media control protocol module 136.

As will be discussed below, once a SIP dialog between one or more SIP UAs 108 and/or the SIP conference controller 120 is established, a media session may be directly established between the SIP UAs 108 whereby media may be delivered via the media gateway 132. For example, a voice or video media stream may be established between SIP UAs 108 and the media gateway 132 using Real Time Protocol (RTP). At some point, the SIP conference controller 120 may experience one or more outages or catastrophic events such that the SIP conference controller 120 restarts. This may be for various reasons, such as, a hardware failure, a software failure, a firmware failure, a power failure, a network failure, and/or the like. As a result, all call dialog information that once resided on the SIP conference server 120 is lost.

In comparative examples, once the SIP conference controller 120 comes back online after experiencing such an event, the one or more media gateways 132 register back to the SIP conference controller 120, providing the SIP conference controller 120 the necessary call context information for all calls that are utilizing the media gateway server 132. However, although the media path between the SIP UA 108 and the media gateway 132, and thus the conference call, may be maintained, the call dialog is never re-established. That is, the call dialog may stay in a preservation mode. Accordingly, features such as adding a new participant, transferring participants, and placing participants on hold are no longer available and will not work even though the media path, and thus the conference call, appear to conference participants as if the communication system 100 has not been impacted by the failure.

In accordance with embodiments of the present disclosure, the call dialog may be reestablished by relying on information generated and provided to the media gateway 132 during the call setup process. That is, referring to FIG. 2, additional details of the communication system 100 are provided as communication system 200 in accordance with embodiments of the present disclosure. The communication system 200 may include the same or similar components as that of communication system 100 in FIG. 1. Accordingly, for purposes of clarity, descriptions of components having the same reference character have been omitted. During a conference call setup or establishment process, the network element 104, via the SIP UA 108, may initiate a conference call utilizing the SIP conference controller 120. Accordingly, the SIP UA 108 may generate an INVITE message together with the Session Description Protocol (SDP) data describing the media attributes that the requester desires for the call. Such an INVITE message may be provided to the SIP module 116 via the SIP proxy 112. In accordance with embodiments of the present disclosure, the SIP proxy 112 provides the INVITE message and SDP offer from the SIP UA 108 to the SIP conference controller 120. That is, the SDP offer from the SIP UA 108 may be mapped for H.248/MSML interoperability purposes by an SDP mapper residing between the SIP module 124 and the media control protocol module 128. Accordingly, the media control protocol module 128 may generate an ephemeral termination and context, if none exists, by requesting an Add (Request). In accordance with embodiments of the present disclosure, for the ephemeral termination, the media control protocol module 128 specifies few SDP parameters in the local and remote descriptors. That is, the local and remote descriptors may be under-specified. In under-specifying the local and remote descriptors, the media gateway 132 assigns values for the local descriptor on its own.

Figure 2:
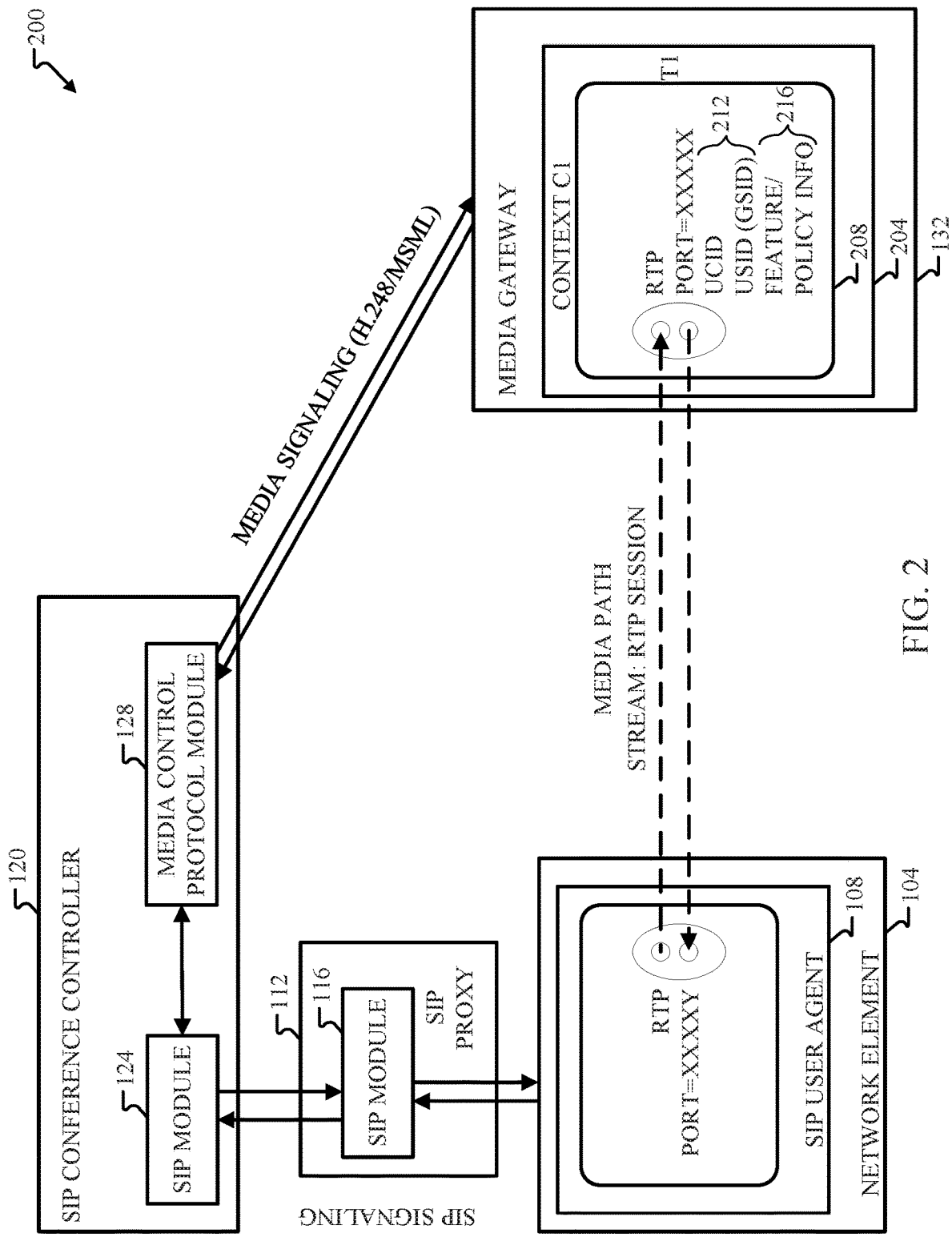
FIG. 2 depicts additional details of an embodiment of the communication system 100 in accordance with embodiments of the present invention.

That is, in a response message to the SIP conference controller 120, the local descriptors (e.g., the descriptors dealing primarily with the media flowing into the media gateway 132) may be over-specified, as the media gateway 132 may operate in accordance with a multitude of capabilities. Accordingly, the response message to the SIP conference controller 120 from the media gateway 132 may include an allocated context, such as context 204, which consists of a list of common codecs, the local IP address of the media gateway 132, and ephemeral termination information 208 including an RTP port. The SIP conference controller 120, now having local descriptor information for the media gateway 132, may issue a modify request message to modify the termination information 208 using a termination ID and/or context ID, for example. The modify request may include specified remote and local descriptor information, as well as another property for the termination 208. That is, the modify request sent by the SIP conference controller 120 may add the Conference ID property and the Unique Session ID (e.g., GSID) 212 for the ephemeral termination 208. In addition to sending the Unique Session ID and the Unique Conference ID 212, the modify request may also include other feature and/or policy information 216. Examples of other feature and/or policy information 216 include, but are not limited to, feature states and button states that the SIP conference controller 120 may recover following a restart or other catastrophic failure. As the Unique Session ID is unique per ephemeral session, the Unique Session ID provides the ability for a SIP UA 108 to look up call information for a currently working media path based on such a Unique Session ID. Accordingly, the media gateway address and the Unique Session ID may be provided in a corresponding response message (e.g., an SDP response) from the media gateway 132 and/or the SIP conference controller 120 when reconstructing a SIP dialog. In accordance with embodiments of the present disclosure, assuming the SIP UA 108 acknowledges the OK message sent from the SIP conference controller 120 via the SIP Proxy 112, a media path based on the local and remote descriptors may be established between the SIP UA 108 and the media gateway 132 as illustrated in FIG. 2. Accordingly, such a process may be completed for each SIP UA 108 participating in a conference call, where each SIP UA 108 utilizes a Unique Session ID but shares the Unique Conference ID.

Upon a SIP conference controller 120 restart, the SIP conference controller 120 loses all call dialog information. Accordingly, the media gateway 132 may re-register with the SIP conference controller 120 and generate a Notify request including the Unique Session ID, the Unique Conference ID, and the remote and local descriptors for ephemeral termination 208. That is, the media gateway 132 provides a full list of call and conference contexts currently in its possession to the SIP conference controller 120. Moreover, the media gateway 132 may also provide the previously stored feature and/or policy information, in addition to the Unique Session ID, the Unique Conference ID, and the remote and local descriptors. Accordingly, the SIP conference controller 120, based on the existence of connections with ephemeral terminations 208, initiates the reconstruction of the SIP dialog. Similarly, the SIP conference controller 120 may initiate the reconstruction of the feature and/or policy information as well.

Upon a SIP conference controller 120 failure such that the SIP conference controller 120 is unable to restart or otherwise is out of commission, a different and/or new SIP conference controller, such as a standby server in the same or different geographic location, may come online and fulfill the roll of the previous SIP conference controller 120. Accordingly, the media gateway 132 may register with the new SIP conference controller and generate a Notify request including the Unique Session ID, the Unique Conference ID, and the remote and local descriptors for ephemeral termination 208. That is, the media gateway 132 provides a full list of call and conference contexts currently in its possession to the new SIP conference controller. Moreover, the media gateway 132 may also provide the previously stored feature and/or policy information, in addition to the Unique Session ID, the Unique Conference ID, and the remote and local descriptors. Accordingly, the new SIP conference controller, based on the existence of connections with ephemeral terminations 208, initiates the reconstruction of the SIP dialog. Similarly, the new SIP conference controller may initiate the reconstruction of the feature and/or policy information as well.

Alternatively, or in addition, upon a SIP conference controller 120 restart or other catastrophic event, the SIP conference controller 120 loses all call dialog information. Accordingly, the media gateway 132 may re-register with the SIP conference controller 120 generating a Service Change and subsequently an Audit message to allow the SIP conference controller 120, more specifically, the media control protocol module 128, to synchronize its state with the media gateway 132. Upon the media gateway 132 providing a full list of call and conference contexts currently in its possession to the SIP Conference Controller 120, the SIP conference controller, based on the existence of connections with ephemeral terminations 208, initiates the reconstruction of the SIP dialog.

During the SIP dialog reconstruction process, the SIP conference controller 120 typically generates an Out-of-Dialog REFER message wherein the R-URI is the Unique Conference ID that was received from the media gateway 132. A separate header of the Out-of-Dialog REFER message may include the Unique Session ID for the specific SIP UA 108. That is, upon receiving the Out-of-Dialog REFER message, the SIP UA 108 will identify the REFER message as a reconstruction. Accordingly, using the Unique Session ID, the SIP UA 108 may identify the call in process having a termination with the specific Unique Session ID. Upon identifying such call from the call state information maintained at the SIP UA 108, for example, the SIP UA 108 initiates a new INVITE message for a new dialog, where the SDP offer is the same as the initial dialog. The new INVITE message is sent to the R-URI received with the media parameters received from the SIP conference controller 120. Upon receiving the new INVITE message from the SIP UA 108, the SIP conference controller 120 identifies that the INVITE message is associated to the SIP UA 108 and links them together. Upon receiving an OK from the SIP conference controller 120, the SIP UA 108 proceeds to drop the initial dialog by issuing a BYE. The SIP conference controller 120 performs a similar process for other SIP UAs participating in the conference call. That is, the SIP conference controller 120 will send a similar REFER message with the R-URI as the conference ID and a separate header for the Unique Session ID specific to the SIP UA. Accordingly, upon completing the reconstruction process for the other SIP UAs participating in the conference call, and upon reconstructing feature and/or policy information if provided, the reconstruction of the SIP dialog is complete.

Figure 3:
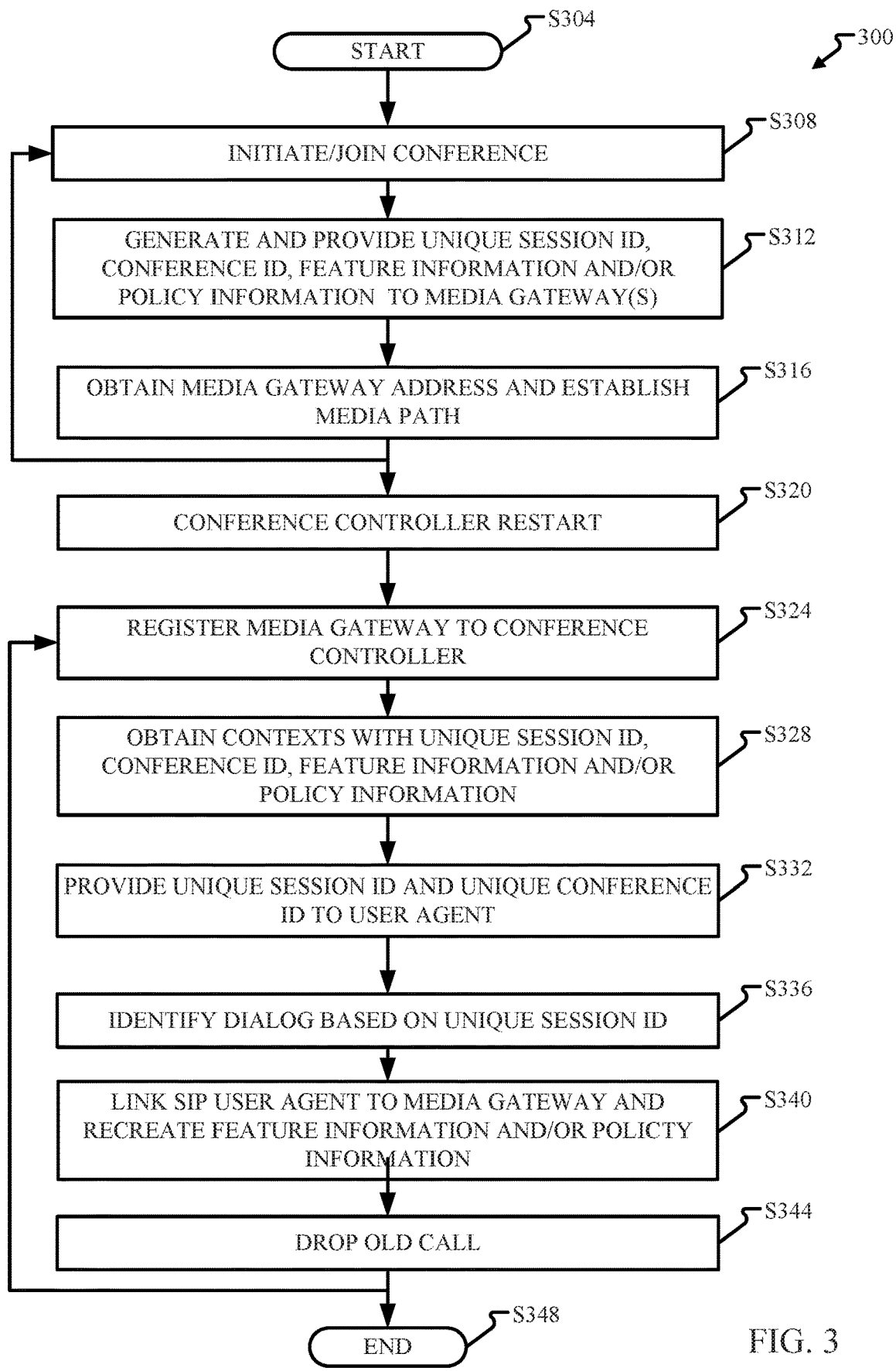
FIG. 3 generally depicts an embodiment of a method for reconstructing a SIP dialog.

Referring now to FIG. 3, a method 300 for reconstructing a SIP dialog is described in accordance with embodiments of the present disclosure. Method 300 is, in embodiments, performed by one or more devices, such as the one or more devices included in the system 100 and system 200. More specifically, one or more hardware and software components including the SIP UA 108 of a respective network element 104, the SIP proxy server 112, the SIP conference controller 120, and the media gateway 132 may be involved in performing method 300. In one embodiment, one or more of the previously described modules and/or devices perform one or more of the steps of method 300. The method 300 may be executed as a set of computer-executable instructions, executed by one or more of the previously described SIP UA 108 of a respective network element 104, SIP proxy server 112, SIP conference controller 120, and media gateway 132, encoded or stored on a computer-readable medium. Hereinafter, the method 300 shall be explained with reference to systems, components, modules, software, etc. described with respect to FIGS. 1 and 2.

Method 300 may continuously flow in a loop, flow according to a timed event, or flow according to a change in an operating or status parameter. Method 300 is initiated at step S304 where a first participant may wish to establish or initiate a phone conference. Accordingly, at step S308, the network element 104, via the SIP UA 108, may initiate a conference call utilizing the SIP conference controller 120. Accordingly, the SIP UA 108 may generate an INVITE message together with the Session Description Protocol (SDP) data describing the media attributes that the requester desires for the call. Such an INVITE message may be provided to the SPI module 116 via the SIP proxy 112. At step S312, and in accordance with embodiments of the present disclosure, the SIP proxy 112 provides the INVITE message and SDP offer from the SIP user agent 108 to the SIP conference controller 120. At least one of the SIP proxy 112 and/or the SIP conference controller 120 generates a Unique Session ID and a Unique Conference ID, where the Unique Session ID is specific to at least one termination 208 within the media gateway 132. At step S312, the Unique Session ID and the Unique Conference ID may be stored at the media gateway 132. In addition to the Unique Session ID and the Unique Conference ID being stored at the media gateway 132, other feature and/or policy information, such as, but are not limited to, feature states and button states, may be stored at the media gateway 132. The media gateway address may be provided to the SIP UA 108 at step S316. Further, at step S316, a media path between the media gateway 132 and the SIP UA 108 may be established such that media (e.g., voice, video etc.) is provided via the media path.

Upon a SIP conference controller 120 restart at step S320, the SIP conference controller 120 loses all call dialog information. Accordingly, the media gateway 132 may re-register with the SIP conference controller 120 at step S324 and provide the SIP conference controller 120 the Unique Session ID, the Unique Conference ID, and context information with respect to the media path(s) established between the media gateway 132 and one or more SIP UAs 108 at step S328. In addition to providing the Unique Session ID and the Unique Conference ID to the SIP conference controller 120, the media gateway 132 may also send the previously stored feature and/or policy information at step S328. The Unique Session ID and the Unique Conference ID may then be provided to the SIP UA 108 at step S332 using an Out-of-Dialog REFER message having the R-URI set as the Unique Conference ID. The previous call dialog to be reconstructed may be identified based on the Unique Session ID at step S336. At step S340, a link between the SIP UA 108 and the SIP conference controller 120 may be made based on the following: (i) information in the new INVITE message having the same SDP offer as the one from the initial dialog, and (ii) existing local descriptor information from the media gateway 132. Further, at step S340, the feature information and/or policy information received from the media gateway 132 may be reconstructed. At step S344, the SIP UA 108 may drop the old call dialog based on the Call-ID with a BYE message. Accordingly, the SIP call dialog is reconstructed for a specific SIP UA 108 and the process 300 may end at step S348. It should be noted that following step S316, the steps S308-316 may be repeated for each of the UAs participating or otherwise involved in a conference call. Moreover, upon a SIP conference controller 120 restart at step S320, steps S324-S344 may be repeated for each of the UAs participating or otherwise involved in a conference call.

Figure 4:
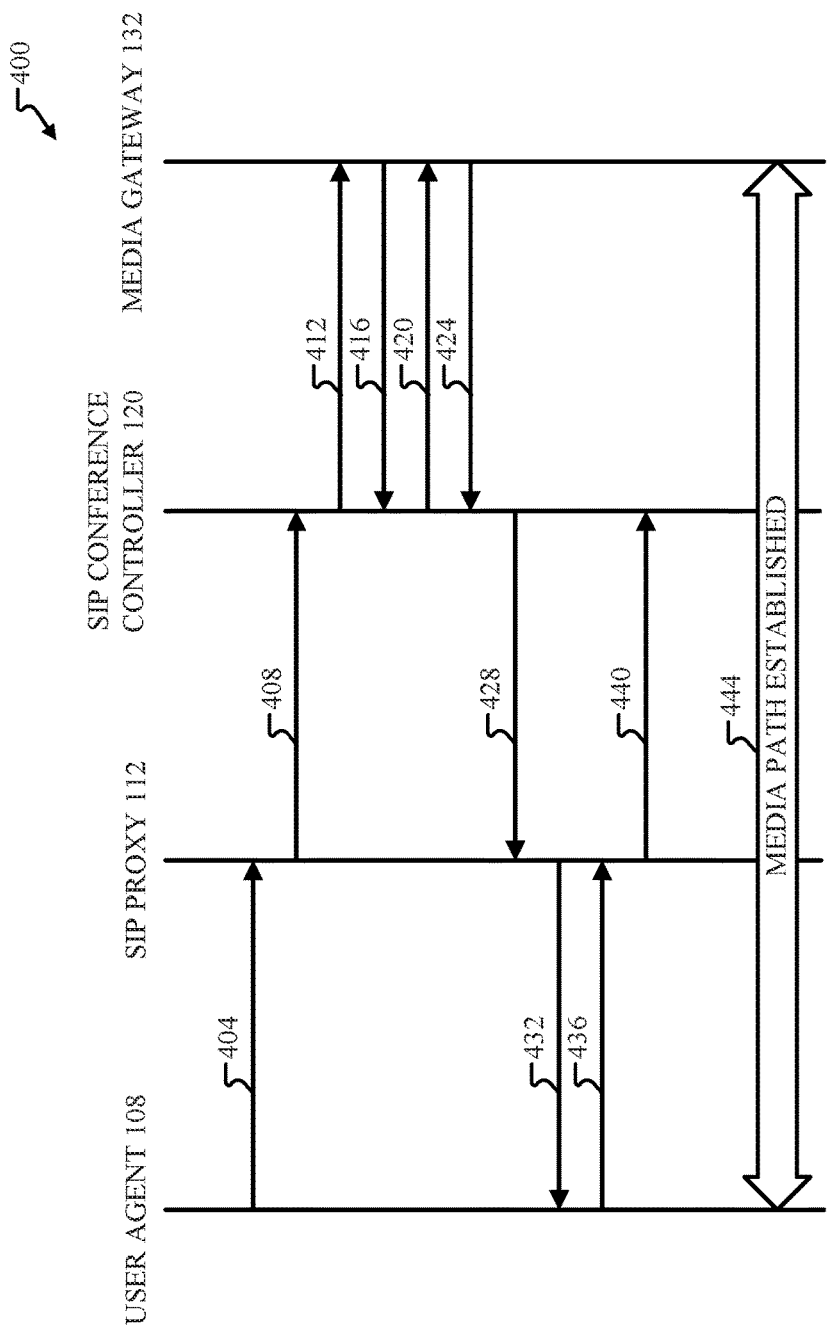
FIG. 4 is a flow diagram of an embodiment of a method for establishing a SIP dialog between a SIP user agent and a SIP conference controller.

Referring now to FIG. 4, a flow diagram of a method for establishing a SIP dialog between a SIP UA 108 and a SIP conference controller 120 is illustrated. In accordance with embodiments of the present disclosure, the SIP UA 108 of a respective network element 104, the SIP proxy server 112, the SIP conference controller 120, and the media gateway 132 are stored-program-controlled entities, such as a computer or processor, which perform the method of FIG. 4 and the processes described herein by executing program instructions stored in a tangible computer-readable storage medium, such as a memory or disk. Although the method described in FIG. 4 is illustrated in a specific order, one of skill in the art would recognize that the steps in FIG. 4 may be implemented in a different order and/or be implemented in a multi-threaded environment. Moreover, various steps may be omitted or added based on implementation.

FIG. 4 depicts a call setup or establishment process 400 in which the network element 104, via the SIP UA 108, may initiate a conference call utilizing the SIP conference controller 120 at step 404. Accordingly, the SIP UA 108 may generate an INVITE message together with SDP data describing the media attributes that the requester desires for the call at step 404. Such an INVITE message, together with the SDP offer, may be provided to the SIP proxy 112 at step 404. In accordance with embodiments of the present disclosure, the SIP proxy 112 provides the INVITE message and SDP offer received from the SIP UA 108 to the SIP conference controller 120 at step 408. At least one of the SIP proxy 112 and the SIP conference controller 120 generate a Unique Session ID, where the Unique Session ID is generated per ephemeral (per SIP UA) at step 408. In accordance with some embodiments of the present disclosure, the Unique Session ID may be the same as or similar to the Global Session ID. A Global Session ID may be generated in accordance with the procedures outlined in U.S. application Ser. No. 13/626,066, the entire contents of which are herein incorporated by reference for all that it teaches and for all purposes. Alternatively, or in addition, the media control protocol module 128 may cause the media gateway 132 to generate an ephemeral termination 208 and context, if none exists, by requesting an Add (Request) at step 412. In accordance with embodiments of the present disclosure, for the ephemeral termination 208, the media control protocol module 128 specifies few SDP parameters in the local and remote descriptors. That is, the local and remote descriptors may be under-specified. In under-specifying the local and remote descriptors, the media gateway 132 assigns values for the local descriptor on its own.

That is, in a response message to the SIP conference controller 120 at step 416, the local descriptors (e.g., the descriptors dealing primarily with the media flowing into the media gateway 132) may be over-specified, as the media gateway 132 may operate in accordance with a multitude of capabilities. Accordingly, the response message to the SIP conference controller 120 from the media gateway 132 at step 416 may include an allocated context, such as context 204, which consists of a list of common codecs, the local IP address of the media gateway 132, and ephemeral termination information 208 including an RTP port. The SIP conference controller 120, now having local descriptor information for the media gateway 132, may issue a modify request message to modify the termination information 208 using a termination ID and/or context ID for example at step 420. The modify request may include specified remote and local descriptor information, as well as another property for the termination 208. That is, the modify request sent by the SIP conference controller 120 at step 420 may add the Conference ID property and the Unique Session ID (e.g., GSID) for the ephemeral termination 208. As the Unique Session ID is unique per ephemeral session, the Unique Session ID provides the ability for a SIP UA 108 to look up call information for a currently working media path based on such a Unique Session ID. In addition to sending the Unique Session ID and the Unique Conference ID, the modify request may also include other feature and/or policy information. Examples of other feature and/or policy information include, but are not limited to, feature states and button states that the SIP conference controller 120 may recover following a restart or other catastrophic failure. The media gateway 132 may provide a Modify response at step 424. Accordingly, the media gateway address and the Unique Session ID may be provided in a 200 OK message from the SIP conference controller 120 to the SIP proxy 112 at step S428. Such a 200 OK message may include an SDP response from the SIP conference controller 120. Further, the media gateway address and the Unique Session ID may be provided from the SIP proxy 112 to the SIP UA 108 at step 432. An ACK message from the SIP UA 108 is provided to the SIP proxy 112 at step 436, and a subsequent ACK message from the SIP proxy 112 is provided to the SIP conference controller 120 at step S440. Accordingly, a media path 444 based on the local and remote descriptors may be established between the SIP UA 108 and the media gateway 132 as illustrated in FIG. 2. Accordingly, such a process 400 may be completed for each SIP UA 108 participating in a conference call, where each SIP UA 108 utilizes a Unique Session ID but shares the Unique Conference ID. Moreover, in instances where the conference call spans two or more media gateways 132, the same Unique Conference ID is sent to all terminations 208 on each of the media gateways 132.

Figure 5:
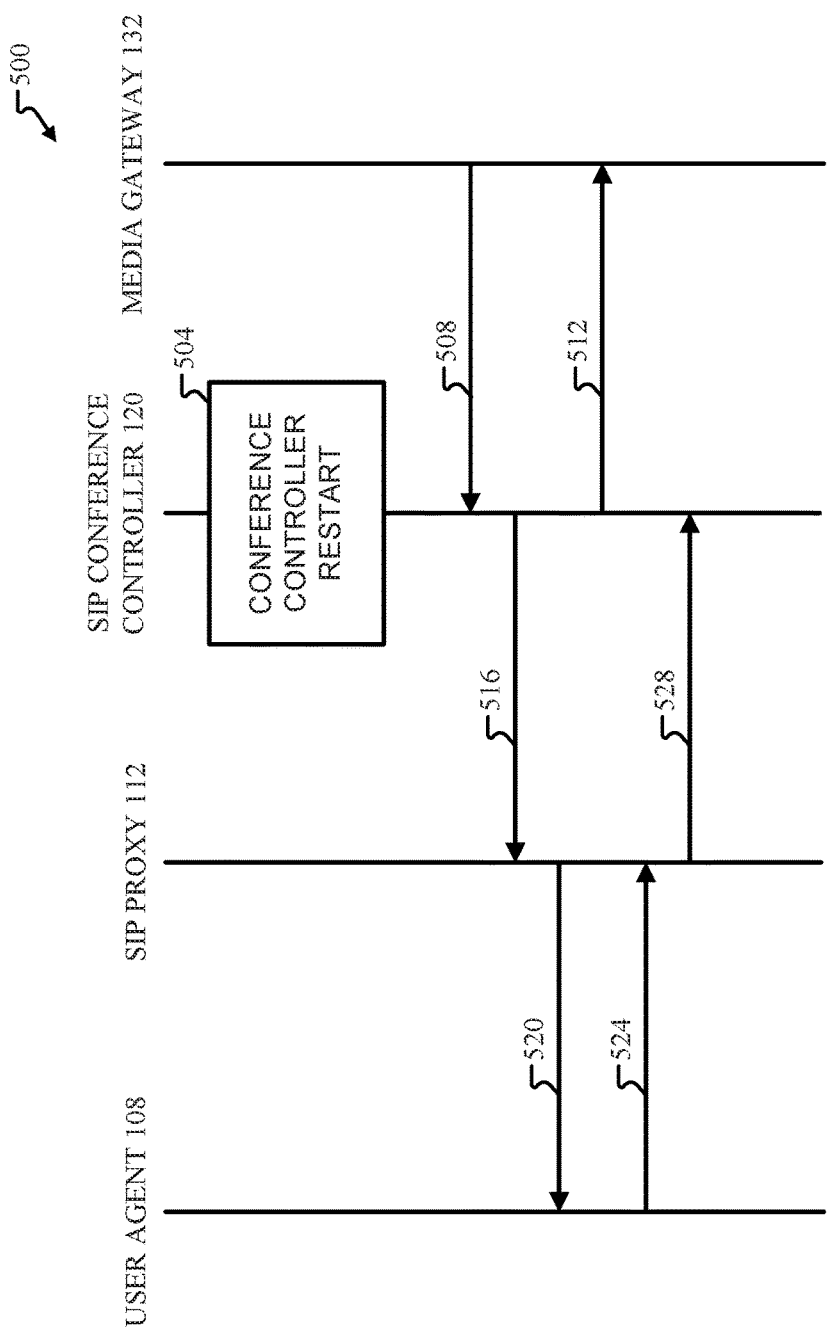
FIG. 5 depicts a flow diagram of an embodiment of a method generally directed to specific actions of a media gateway and SIP conference controller for reconstructing a SIP dialog following a reboot of the SIP conference controller.

FIG. 5 is a flow diagram directed to a method 500 generally specific to media gateway 132 and SIP conference controller 120 actions for reconstructing a conference call for a single SIP UA 108 following a reboot of the SIP conference controller 120. In accordance with embodiments of the present disclosure, the SIP UA 108 of a respective network element 104, the SIP proxy server 112, the SIP conference controller 120, and the media gateway 132 are stored-program-controlled entities, such as a computer or processor, which perform the method of FIG. 5 and the processes described herein by executing program instructions stored in a tangible computer-readable storage medium, such as a memory or disk. Although the method described in FIG. 5 is illustrated in a specific order, one of skill in the art would recognize that the steps in FIG. 5 may be implemented in a different order and/or be implemented in a multi-threaded environment. Moreover, various steps may be omitted or added based on implementation.

FIG. 5 depicts a conference call reconstruction process generally specific to the actions of the media gateway 132 and the SIP conference controller 120. Upon a SIP conference controller 120 restart at step 504, the SIP conference controller 120 loses all call dialog information. Accordingly, the media gateway 132 may re-register with the SIP conference controller 120 and generate a Notify request including the Unique Session ID, the Unique Conference ID, and the remote and local descriptors for ephemeral termination 208 at step 508. That is, the media gateway 132 provides a full list of call and conference contexts currently in its possession to the SIP conference controller 120. Moreover, the media gateway 132 may also provide the previously stored feature and/or policy information, in addition to the Unique Session ID, the Unique Conference ID, and the remote and local descriptors at step 508 to the SIP conference controller 120. The SIP conference controller 120 may send a Notify response to the media gateway 132 at step 512.

The SIP conference controller 120, based on the existence of connections with ephemeral terminations 208, initiates the reconstruction of the SIP dialog at step 516. That is, during the SIP dialog reconstruction process, the SIP conference controller 120 typically generates an Out-of-Dialog REFER message at step 516. The R-URI is the Unique Conference ID that was received from the media gateway 132 at step 508. A separate header of the Out-of-Dialog REFER message may include the Unique Session ID for the specific SIP UA 108. The REFER message with separate header for the Unique Session ID for the specific SIP UA 108 will be received at the SIP proxy 112 from the SIP conference controller 120 at step 516. The SIP proxy 112 then sends the REFER message having the R-URI as the conference ID and the separate header for the Unique Session ID received from the media gateway 132 for the specific SIP UA 108 at step 520. The SIP UA 108 may return a 202 Accepted message to the SIP proxy 112 at step 524, and the SIP proxy 112 may send the corresponding 202 Accepted message to the SIP conference controller 120 at step 528.

Figure 6:
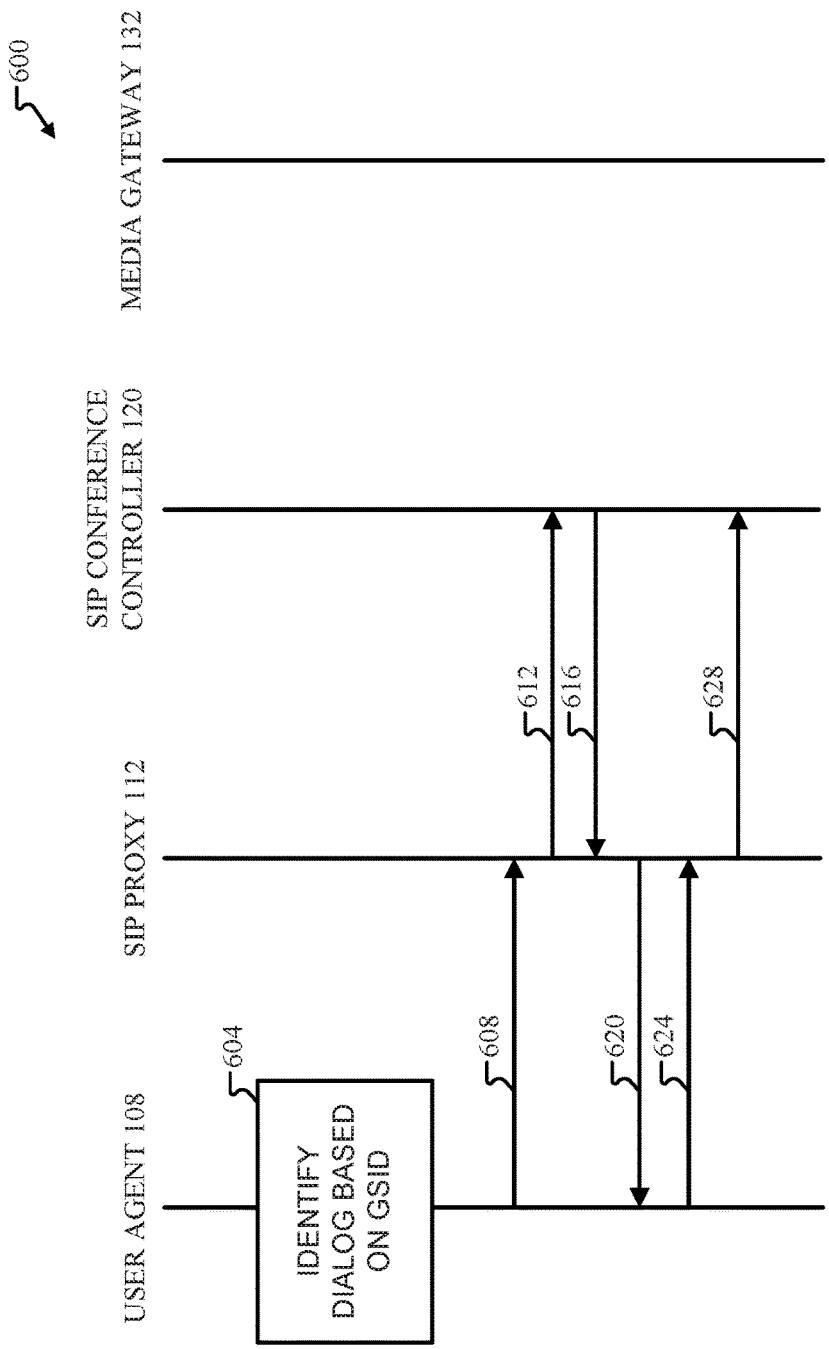
FIG. 6 depicts a flow diagram of an embodiment of a method generally directed to specific actions of a user agent when reconstructing a SIP dialog following a reboot of a SIP conference controller.

FIG. 6 is a flow diagram directed to a method 600 generally specific to the SIP UA 108 actions for reconstructing a conference call for a single SIP UA 108 following a reboot of the SIP conference controller 120. In accordance with embodiments of the present disclosure, the SIP UA 108 of a respective network element 104, the SIP proxy server 112, and the SIP conference controller 120 are stored-program-controlled entities, such as a computer or processor, which perform the method of FIG. 6 and the processes described herein by executing program instructions stored in a tangible computer-readable storage medium, such as a memory or disk. Although the method described in FIG. 6 is illustrated in a specific order, one of skill in the art would recognize that the steps in FIG. 6 may be implemented in a different order and/or be implemented in a multi-threaded environment. Moreover, various steps may be omitted or added based on implementation.

FIG. 6 depicts a conference call reconstruction process generally specific to the actions of the SIP UA 108. Upon receiving the Out-of-Dialog REFER message and the Unique Session ID, and/or Global Session ID, at step 520, the SIP UA 108 identifies the REFER message as a reconstruction based on a tag parameter in the Request-URI (R-URI). Accordingly, using the Unique Session ID, the SIP UA 108 may identify the call in process having a termination with the specific Unique Session ID at step 604. That is, the call state information maintained at the SIP UA 108 may be examined to determine if any existing terminations match or otherwise include the Unique Session ID. Upon identifying such call dialog based on the Unique Session ID, the SIP UA 108 initiates a new INVITE message for a new dialog at step 608, where the SDP offer is the same as the offer in the initial dialog of step 404. That is, the new INVITE message is sent to the R-URI received with the media parameters received from the SIP conference controller 120 at step 608. The SIP proxy 112 sends the INVITE message to the R-URI at step 612 with the SDP offer being the same as the initial dialog at step 404. Accordingly, the new INVITE message and the SDP offer are received at the SIP conference controller 120. Upon receiving the INVITE from the SIP UA 108, the SIP conference controller 120 identifies the ephemeral of which the INVITE message is associated to and links the two together in the SIP conference controller 120 context information. At step 616, an OK response, such as a 200 response, containing the SDP answer indicating that such capabilities sent by the media gateway 132 to the SIP conference controller 120 will be used, is sent to the SIP proxy 112. The SIP proxy forwards the 200 OK response with the SDP answer to the SIP UA 108 at step 620. The SIP UA 108 sends an ACK message to the SIP proxy at step 624 and the SIP proxy 112 sends the received ACK message to the SIP conference controller 120 at step 628.

Figure 7:
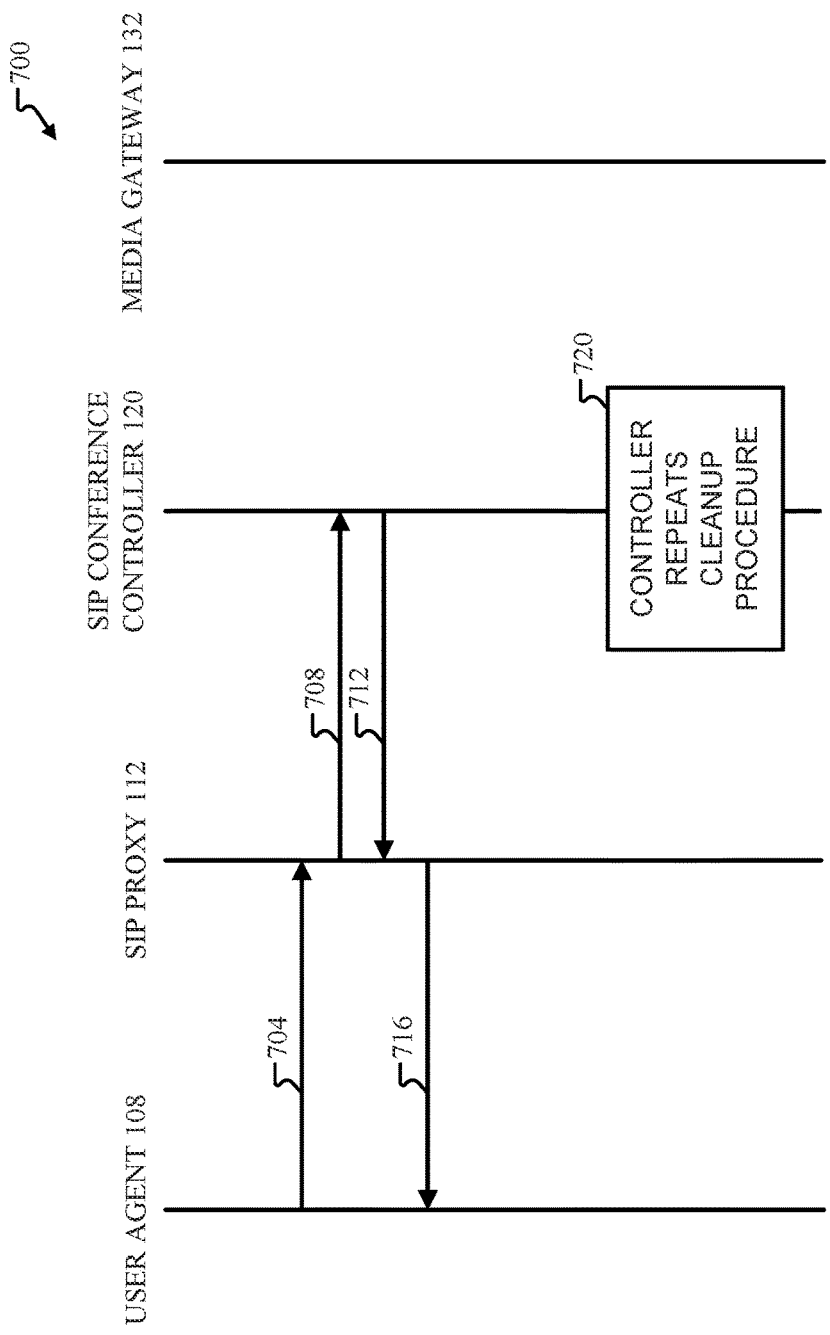
FIG. 7 depicts a flow diagram of an embodiment of a method generally directed to specific actions of a user agent performing SIP dialog cleanup following the reconstructing of a SIP dialog following a reboot of a SIP conference controller.

FIG. 7 is a flow diagram directed to a method 700 generally specific to the SIP UA 108 and SIP conference controller 120 actions for reconstructing a conference call for a single SIP UA 108 following a reboot of the SIP conference controller 120. In accordance with embodiments of the present disclosure, the SIP UA 108 of a respective network element 104, the SIP proxy server 112, and the SIP conference controller 120 are stored-program-controlled entities, such as a computer or processor, which perform the method of FIG. 7 and the processes described herein by executing program instructions stored in a tangible computer-readable storage medium, such as a memory or disk. Although the method described in FIG. 7 is illustrated in a specific order, one of skill in the art would recognize that the steps in FIG. 7 may be implemented in a different order and/or be implemented in a multi-threaded environment. Moreover, various steps may be omitted or added based on implementation.

FIG. 7 depicts a conference call reconstruction process generally specific to cleanup actions of the SIP UA 108 and the SIP conference controller 120. After receiving the 200 OK response from the SIP conference controller 120 at step 520, the SIP UA 108 sends a BYE request for the initial dialog at step 704. That is, the BYE message terminates the session and the dialog associated with it and may be identified by the Call-ID. Such a BYE message is sent to the SIP conference controller 120 at step 708 where the SIP conference controller 120 terminates the session and the dialog associated with it. At step 712, the SIP conference controller 120 responds with a 200 OK response to the SIP proxy 112; likewise, the SIP proxy 112 forwards the 200 OK response to the SIP UA 108 at step 716. The SIP conference controller 120 performs a similar cleanup process for other SIP UAs 108 participating in the conference call at step 720. That is, the SIP conference controller 120 will send a similar REFER message with the R-URI as the conference ID and a separate header for the Unique Session ID specific to the SIP UA 108. Accordingly, upon completing the reconstruction process for the other SIP UAs 108 participating in the conference call, the reconstruction of the SIP dialog is complete.

In accordance with embodiments of the present disclosure, the network elements 104A-104D were depicted as being connected to the SIP proxy 112 via communication network 810. As can be appreciated, not all of the network elements 104, and hence not all of the respective UAs 108, are routed through the proxy server 112. Rather, in some embodiments, it is contemplated that the network element 104 may be connected to the SIP conference controller 120 directly via network 810.

Figure 8:
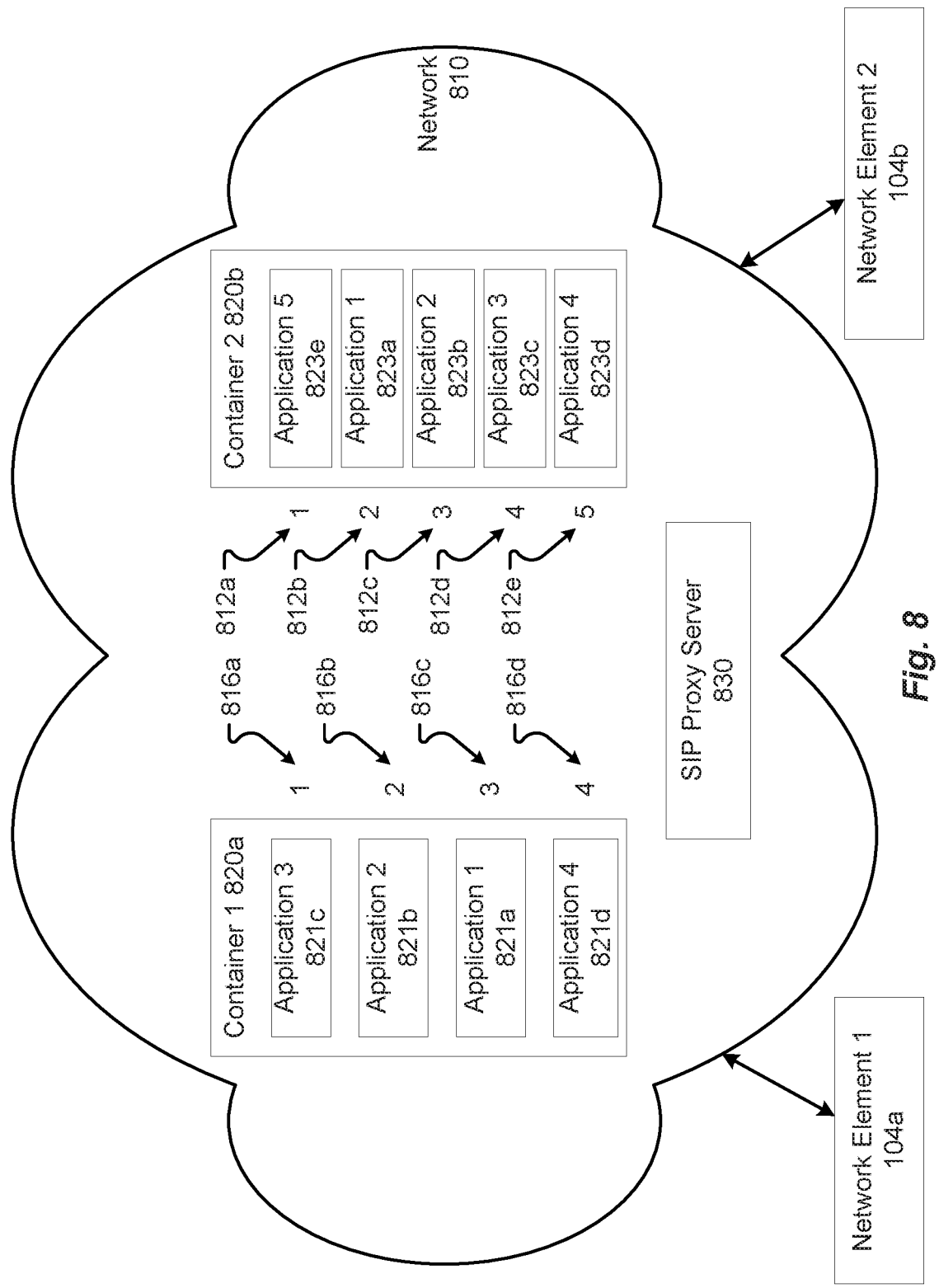
FIG. 8 depicts a logic diagram of an embodiment of a conference environment having multiple applications sequenced in the communication path that need to be reconstructed in the event of a reconstructions.

FIG. 8 is a block diagram of a logical environment 100 for a system 100 for facilitating a communication session. The environment 800 comprises network elements (e.g., communication devices) 104a-104b, network 810, containers 820a-820b, and SIP Proxy Server 830.

Network elements 104a-104b can communicate with container 820a, container 820b, and/or SIP Proxy Server 830. Although network elements 104a-104b are shown connected to network 810, network elements 104a-104b can be directly connected to SIP Proxy Server 830 and/or containers 820a-820b. FIG. 8 shows two network elements 104a-104b, but can comprise any number of additional network elements 104.

Network 810 can be any network that can send and receive data, such as the Internet, a Wide Area Network (WAN), a Local Area Network (LAN), the Public Switched Telephone Network (PSTN), a packet switched network, a circuit switched network, a cellular network, a corporate network, a combination of these, and the like. Network 810 can use a variety of protocols, such as Ethernet, Internet Protocol (IP), Session Initiation Protocol (SIP), Integrated Services Digital Network (ISDN), H.323, and the like.

Containers 820a-820b can be any hardware/software that can run a process. For example, containers 820a-820b can be a container running under Linux, a container running under Windows®, a Java Specification Request (JSR) 289 container, and the like. Containers 820a-820b may be a virtualized or non-virtualized container. Containers 820a-820b may be an operating system-level virtualization that provides multiple containers running on the same server. FIG. 8 shows two containers 820a-820b but may comprise more than two containers 820. Containers 820a-820b can run on a single device or on multiple devices, such as a server, a Private Branch Exchange (PBX), a communication system, a switch, a session manager, and the like. Containers 820a-820b can run on a variety of operating systems, such as Unix, Linux, Windows®, Android, a multitasking operating system, a non-multitasking operating system, an embedded operating system, and/or the like.

Containers 820a-820b further comprise two or more application(s) 821 and message processor 830. Application(s) 821 can be any application that interact with electronic communications, such as a voice recording application, a video conferencing application, a voice conferencing application, a call mixer, a call forwarding application, a call forking application, a call hold application, an Instant Message recording application, and/or the like. Message processor 830 can be any hardware/software that can process messages. Message processor 830 may process a variety of messages, such as TCP/IP packets, UDP packets, SIP messages, H.323 messages, Real Time Protocol (RTP) messages, and/or the like.

Front-end processor 830 can be any hardware/software that can process messages such as a server, a router, a communication device 101, a process running in a separate container, a dedicated device, and/or the like. Front-end processor 830 can process a variety of messages, such as TCP/IP packets, UDP packets, SIP messages, H.323 messages, Real Time Protocol (RTP) messages, and/or the like. Front-end processor 830 can be distributed across various servers and devices.

As shown in FIG. 8, the two different containers 820a and 820b are associated with two different network elements 104a, 104b in a conference call. The conference call may have more than two participants, however, for ease of description and clarity, only two are shown. Each container 820a and 820b may have two or more applications or "snap-in" applications invoked during the conference call. These applications 821a-d and 823a-e represent different features that the network elements 104a, 104b or users desire during the conference call. These applications 821, 823 may be opened and have a particular identifier. For example, application 823e is application 5, application 821a is application 1, application 823b is application 2, etc.

Each application 821, 823 may also have a sequence order. A sequence order is not the order in which the application 821, 823 was opened or invoked, but rather a sequence to which the application 821, 823 will be applied during the conference call. For example, application 5 823e has sequence order of 1, represented by reference 812a. In contrast, application 1 823a has sequence 2, represented by reference 812b. Thus, each of the applications 823a-823e have sequences 812a-812e and applications 821a-821d have sequences 816a-816d. Thus, based on the sequence order, application 5 823e will be executed or applied first, while applications 1-4 823a-823d will be executed second through fifth, according to sequence 812b-812e.

Similar to container 820b, container 820a includes applications 1-4 represented by references 821a-821d. The applications 821a-821d also have sequences 816a-816d. Thus, based on the sequence order, application 3 821c is applied first in according to sequence 816a, while application 2 821b is applied second, application 3 821c is applied third, and application 4 821d is applied fourth, according to sequence 816b-816d.

A first message is received at container 82oa. The first message can be sent from network element 104a or 104b either directly or via SIP Proxy Server 830. The first message is an initial message to initiate a first session. For example, the first message may be a SIP INVITE (i.e., to initiate a video session, an audio session, or an IM session) to establish a SIP session from network element 104a to network element 104b. The message to initiate the first session may use a variety of protocols, such as File Transfer Protocol (FTP), H.323, video protocols, SIP, TCP/IP, and/or the like.

Containers 820 for the session may then be established. Container 820a may be a primary container. Container 820b may a secondary container. At least a portion of the state of the sessions in container 820a is replicated in container 820b. In other configurations, container 820a is a primary container for network element 104a and container 820b is the primary container for network element 104b. The secondary containers are not shown in this configuration.

Applications 821, 823 are then initiated in the containers 820. The sequence order 812, 816 of the initiated application may then be recorded and stored in a shared database or memory for later use. The first message is processed first in application 821c. In this example, the first message is processed through subsequent applications 821b-821d in sequence order 816a-816d. While the first message is shown as being processed in four applications, the first message can be processed through one or more applications 821 in container 820a. The first message may then be sent to one of the network elements 104a-104b.

In some configurations, where SIP is used, the first, the second, and the modified messages are SIP messages, and containers 820a-820b are JSR-289 containers. After a failure of the communication session, the applications 821, 823 can be reconstructed in the proper sequence order. The container 820 can reinitiate the applications in the sequence stored at the beginning of the session.

If the SIP protocol is used, the SIP messages used for reconstruction can be a variety of different SIP messages. For example, the second SIP message may be an ACK request to a 2xx INVITE response (where 2xx indicates the SIP number), an ACK request for a 3xx-6xx INVITE response, an in-dialog INVITE request, an in-dialog non-INVITE request, a provisional response, a 2xx response to INVITE, a 3xx-6xx response to INVITE, a final response to a non-INVITE request, a final response to an in-dialog non-INVITE, a response of any kind in the failover group that is not associated with the session manager that received the response, and a request of any kind that is not associated with the session manager that received the response.

An in-dialog message such as an in-dialog SIP Invite can be used to establish a new media stream within an existing communication session. For example, an in-dialog SIP INVITE can be used to create a second SIP communication (e.g., a SIP IM session within a SIP voice session). An out of-dialog message would be the SIP messages to create the original SIP communication session.

In an illustrative example, where SIP is used, the reconstruction of the sequenced applications is conducted with one or more SIP messages. The SIP messages may be sent from SIP Proxy Server 830 to containers 820a, 820b. The reconstructions may be directed because SIP Proxy Server 830 has detected a failure in the communication session. Snap-in application 821, 823 invocation for call reconstruction allows for efficient ordering of snap-in applications 821, 823 from any point in the invocation. This ordering allows for call reconstruction starting with a snap-in applications 821, 823 anywhere in the sequence, including in the middle of the order. The reconstructions mechanism is a variant of session reconstruction described above.

For example, let a call cause N snap-in applications 821, 823 to be sequenced in the following order: {S1, S2, S3, . . . , SN} 812, 816. After a successful reconstruction, the same order is preserved: {S1, S2, S3, . . . , SN} 812, 816. The first step may be to choose is a snap-in application 812, 816 which starts the reconstruction. This snap-in application can be any snap-in application 812, 816, regardless of the snap-in application's place in the sequence order. The selected snap-in application 812, 816 is given the role of an High Availability (HA) Controller (HAC). Based on the selected snap-in application 812, 816, to determine which other, if any, snap-in applications 821, 823 need to be sequenced and reconstructed, some reconstruction message needs to be sent through those snap-in applications 821, 823. The reconstruction message follows the reverse order for snap-in applications 821, 823 sequenced before the HAC and the original sequence for snap-ins after the HAC.

For instance, a call includes snap-in applications 821*a-d* sequenced in order S3 816*a*, S2 816*b*, S1 816*c*, and S4 816*d*. In case of a server failure, the SIP Conference Controller 120 or other module detects the failover scenario and instructs one of the snap-in applications 821 to start the call take over. For example, SIP Conference Controller 120 may select application 821*a* to be the HAC. In a message to application 821*a*, the SIP Conference Controller 120 adds a private header, containing the list of originally sequenced snap-in applications 821 (before the failure) along with the snap-in applications 821 call identifiers (IDs). The header includes the list of all applications 821*a-d* in the original order S3 816*a*, S2 816*b*, S1 816*c*, and S4 816*d*, along with their respective original call-IDs In response to receiving the message, application 821*a* may become the HAC, which initiates the reconstruction process. The other snap-ins application 821*b-d* which are affected by the messages from HAC take on the role of a HA Agent (HAA). The HAC starts the reconstruction process once application 821*a* gets invoked by the SIP Conference Controller 120 and then passes the list of applications, via P-ha-applications header, to a Customer Application Router (CAR). The CAR invokes the applications 821*b-d* in the sequence defined in the application list S3 816*a*, S2 816*b*, S1 816*c*, and S4 816*d*.

In our example, based on P-ha-application, application 821*a* can identify its own identity in the list and build the list of applications before application 821*a* in the reverse order, i.e., application 821*b*, 821*c* and another list for applications, after application 821*a*, in original order, i.e., application 821*d*. Application 821*a* is not in any of these lists as it is initiating the takeover.

The lists are given to the CAR in private headers (e.g., P-HA-ReconstructSnapins) in the SIP reconstruction message by application 821*a*. The CAR may then invoke the sequence of applications 821 for reconstruction in the order that was presented in the lists. The CAR invokes 821*b*, 821*c*, in that order, and in parallel/in sequence to invokes application 821*d*; thus, the HAC and CAR can maintain the original order of application sequencing, S3 816*a*, S2 816*b*, S1 816*c*, and S4 816*d*, for applications 821*c*, 821*a*, 821*b*, and 821*d*, to maintain feature interaction.

The order of sequence of application 821, 823 invocation is maintained after reconstruction. The SIP Conference Controller 120 is able to reconstruct successfully the P-ha-applications using the P-HA-ReconstructSnapins header(s). Many of the above processes have been described using the SIP protocol. However, as one of skill in the art would realize, the above processes are not specific to SIP and can also be implemented using other protocols such as H.323, FTP, video protocols, and/or the like.

Figure 9:
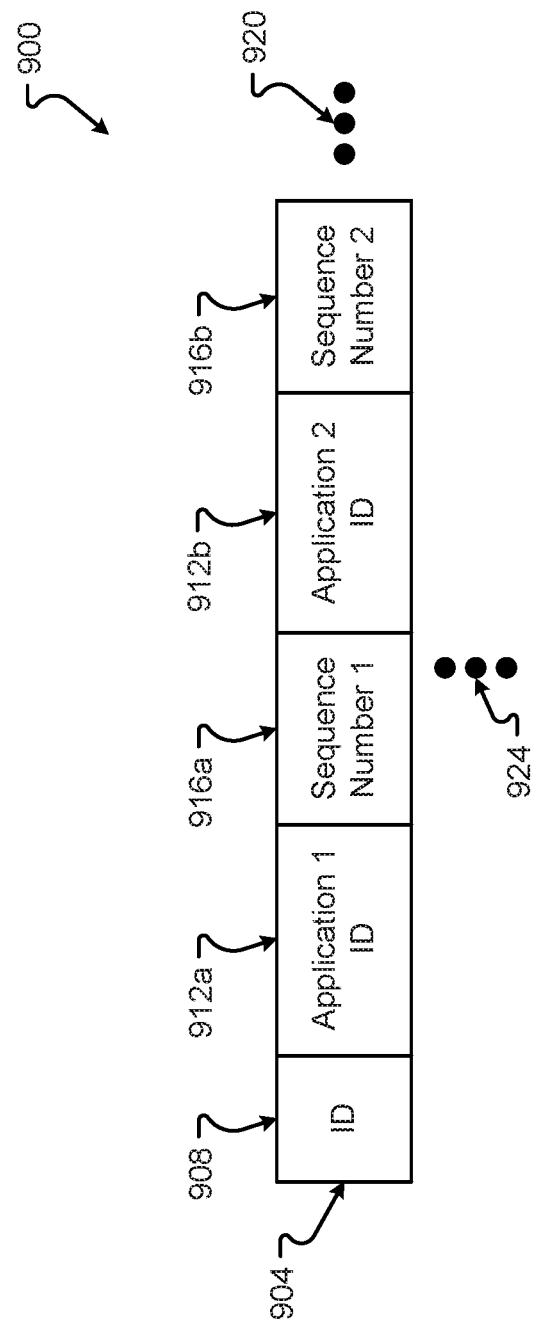
FIG. 9 depicts an embodiment of a data structure stored at conference establishment and retrieved to reconstruct the conference with the proper application sequencing.

When a conference is established and applications are invoked, the SIP conference controller can store a data structure 900 in shared data. The data structure 900 may also form at least a portion of the P-HA-ReconstructSnapins header(s) provided in the invocations of the P-ha-applications, either initially invoked or as reconstructed. This data structure 900 may be as shown in FIG. 9.

The data structure 900 can include one or more records or entries for each conference call or as associated with each user or device involved in a conference call. The record 904 can also include one or more entries 904 for each of the different participants in the conference call. Thus, while a single record 904 is shown, there may be more records than that displayed in FIG. 9 as represented by ellipses 924. Each record for the participant may include an identifier (ID) 908. The ID 908 can identify the container 820, the communication device or network element 104, the user agent 108, etc. that will initiate, use, or apply the different applications 821, 823.

The record 904 may also include an ID 912*a*, 912*b*, which can be an alpha-numeric identifier, a globally unique identifier (GUID), or some other identifier that identifies which applications 821, 823 are being executed for the network elements 104. The ID 912 can represent the call ID for each application, as described above. Thus, the ID 912 may be associated with the application 821, 823 for all calls or only for the particular instance of call.

Each of the records 904 that can also include a sequence for the two or more application identifiers 912. The sequence can be recorded by associating a sequence number 916 with the ID 912, as shown in FIG. 9. Thus, the first application includes an application identifier 912*a* and a sequence listing 916*a*. The application ID 912*a* is paired with the sequence number 916*a*. The sequence number 916 indicates the order in which the application is to be applied during the conference call. A second application 912*b* will have a second sequence number 916*b*. In other configurations, the listing of the application IDs 912*a*-912*n* indicates the sequence order in the data structure 900 and no sequence numbers 916 are necessary.

There may be more application IDs 912 and sequence numbers 916 than those shown in FIG. 9 as represented by ellipses 920. The data structure 900 may be stored in a shared database and may be accessed by different components of the conferencing system to reestablish the applications 821, 823 in the proper order after a call reconstruction.

Figure 10:
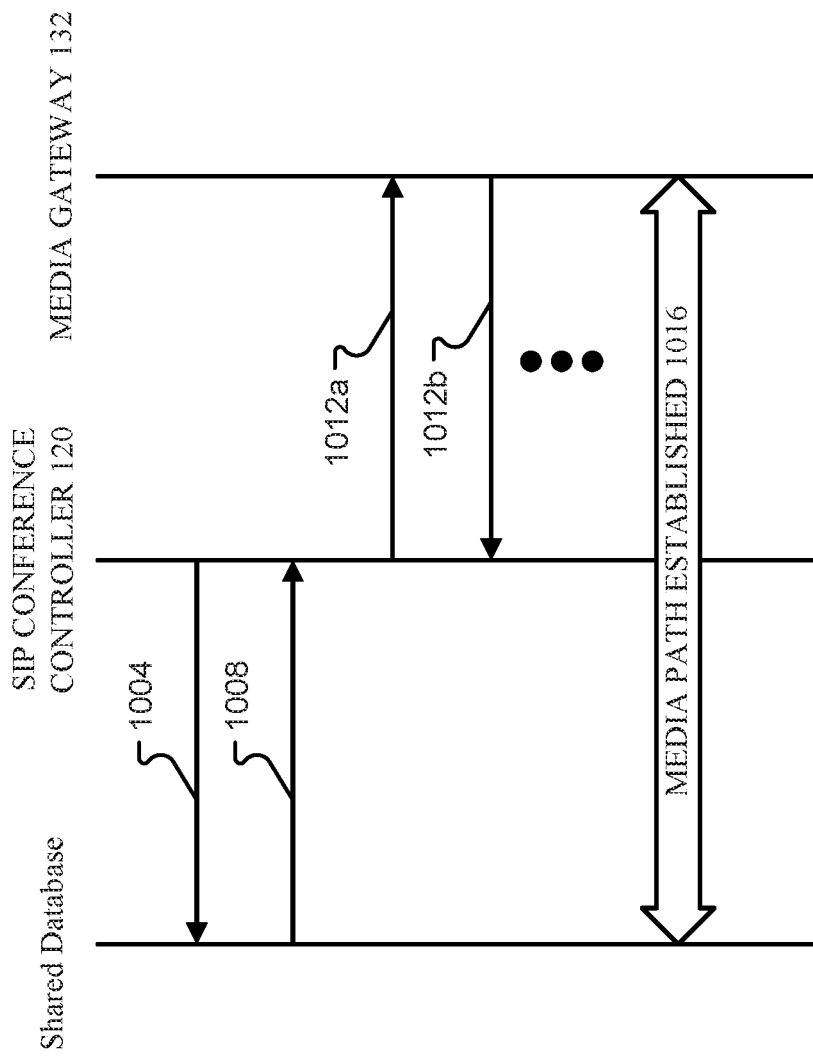
FIG. 10 depicts a flow diagram of an embodiment of a method generally directed to reconstructing application sequencing.

A signaling diagram 1000 describing the snap-in application invocation during call reconstruction may be as shown in FIG. 10. During the call reconstruction, the SIP conference controller 120 can retrieve the data structure 900 from a shared database by sending a message 1004 to the shared database. The shared database may retrieve the data 900 and send that data 900, in a message 1008, to the SIP conference controller 120. The messages 1004 and 1008 may also be a simple retrieve from the database by the SIP conference controller 120. Upon receiving this information 900, the SIP conference controller 120 can then reestablish or re-invoke the applications 821, 823 in the proper sequence.

The SIP conference controller may then send a first message 1012a to sequence and invoke a first application, e.g., application 2 823b. The message 1012A may be sent to the media gateway 132, which can initiate the application 823b. A series of similar messages 1012b (which corresponds to other application 823a, 823c-e) may then be sent by the media gateway and/or the first initiated application 823b to reestablish further applications. The process of reestablishing applications may continue until all applications required by the users are invoked in the proper sequence as represented by ellipses 1020. After all applications are invoked and sequenced, the conference may be reestablished as represented by communication 1016.

Figure 11:
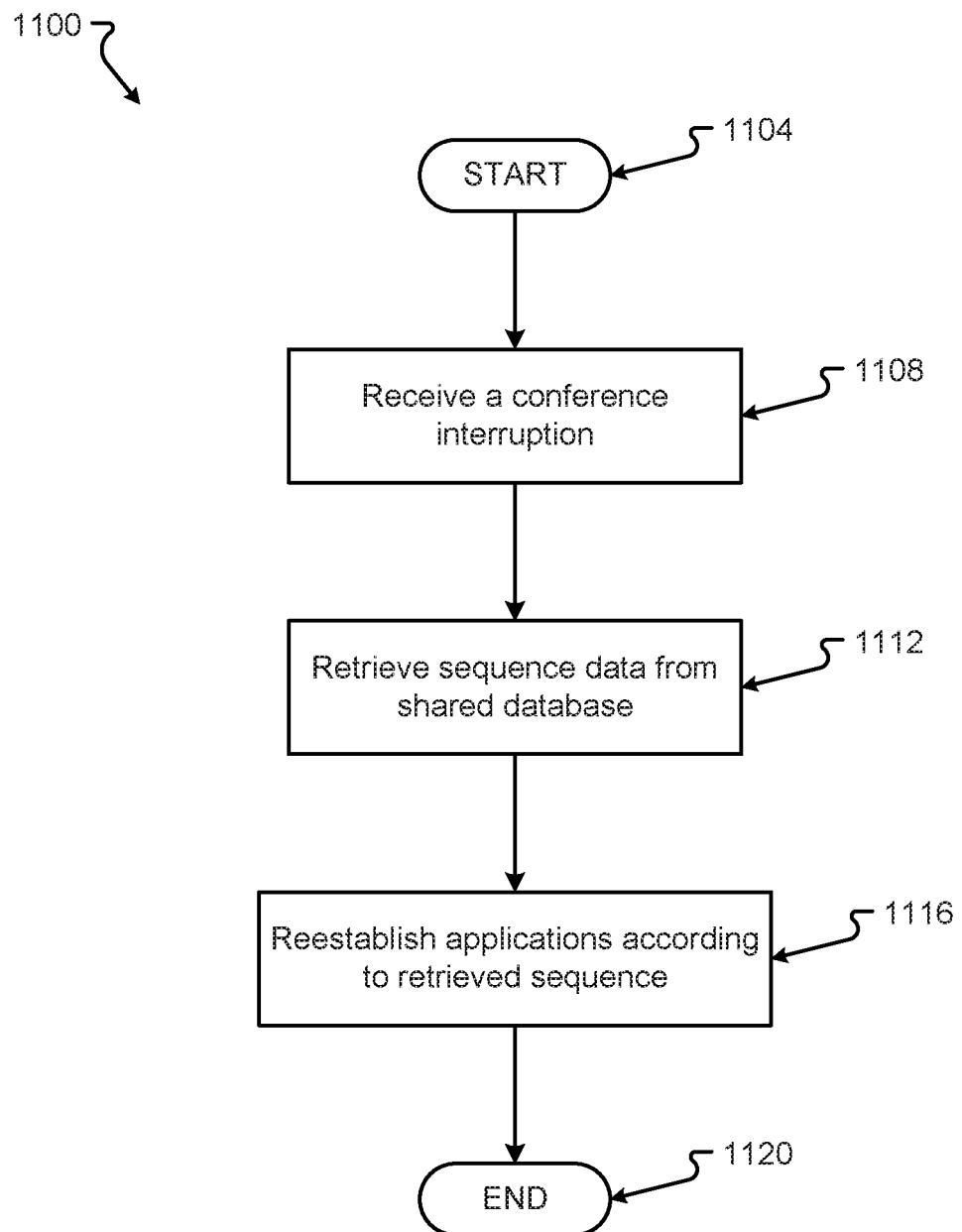
FIG. 11 depicts another flow diagram of an embodiment of a method generally directed to reconstructing application sequencing.

An embodiment for reestablishing a method 1100 for reestablishing an application sequence in a reconstructed conference call may be as shown in FIG. 11. A general order for the steps of the method 1100 is shown in FIG. 11. Generally, the method 1100 starts with a start operation 1104 and ends with an end operation 1120. The method 1100 can include more or fewer steps or can arrange the order of the steps differently than those shown in FIG. 11. The method 1100 can be executed as a set of computer-executable instructions executed by a computer system and encoded or stored on a computer readable medium. Hereinafter, the method 1100 shall be explained with reference to the systems, components, modules, software, data structures, user interfaces, etc. described in conjunction with FIGS. 1-10.

An interruption in the conference call may be received, in step 1108. The SIP conference controller 120 can receive data or another signal, as explained hereinbefore, to determine that a conference has been interrupted. Thereinafter, the SIP conference controller 120 can retrieve the application sequence data 904 from the shared database 900, in step 1112. The retrieval of the data may include retrieving the one or more records 904 from the database 900 that are associated with the one or more participants or network elements 104 in the conference call. This information may be read such that the applications and sequence order may be determined.

The SIP conference controller 120 may then send one or more messages to the media gateway to establish or invoke at least a first application 821, 823 in the proper sequence order, in step 1116. Thus, the SIP conference controller 120 can direct the container 704, 708 of the media gateway 132 to reestablish at least a first application.

Thus, the SIP conference controller 120 may choose a snap-in application, e.g., application 2 823b, which starts the reconstruction. This snap-in application 823b can be any of the snap-in applications, regardless of the snap-in application's place in the sequence order. The selected snap-in application, e.g., application 2 823b, is given the role of a High Availability (HA) Controller (HAC). Based on the selected snap-in application, e.g., application 2 823b, the application 2 823b can determine which other, if any, snap-in applications 821, 823 need to be sequenced and reconstructed and in which order based on data within the P-HA-ReconstructSnapins header(s) of SIP messages sent to application 2 823b to establish itself as the HAC. The reconstruction messages for applications preceding application 2 823b in the sequence order, e.g., application 1 823a and application 5 823e, will be send in the reverse order for snap-in applications, i.e., application 1 823a receives a first message and application 5 823e receives the next message. Messages for applications that follow application 823b, as the HAC, in the sequence order e.g., application 3 823c and application 4 823d, are sent in the original order, i.e., application 3 823c receives a first message and application 4 823d receives the next message. In this way, the HAC can reestablish the applications in the original sequence order.

For instance, a call includes snap-in applications 821a-d sequenced in order S3 816a, S2 816b, S1 816c, and S4 816d. In case of a server failure, the SIP Conference Controller 120 or other module detects the failover scenario and instructs one of the snap-in applications 821 to start the call take over. For example, SIP Conference Controller 120 may select application 821a to be the HAC. In a message to application 821a, the SIP Conference Controller 120 adds a private header, containing the list of originally sequenced snap-in applications 821 (before the failure) along with the snap-in applications 821 call identifiers (IDs). The header includes the list of all applications 821a-d in the original order S3 816a, S2 816b, S1 816c, and S4 816d, along with their respective original call-IDs In response to receiving the message, application 821a may become the HAC, which initiates the reconstruction process for the other applications 821b-d. The other snap-in application 821b-d which are affected by the messages from HAC take on the role of a HA Agent (HAA). The HAC starts the reconstruction process once application 821a gets invoked by the SIP Conference Controller 120, which passes the list of applications and the sequence order, via P-ha-applications header, to a Customer Application Router (CAR). The CAR invokes the applications 821b-d in the sequence defined in the application list S3 816a, S2 816b, S1 816c, and S4 816d.

Figure 12:
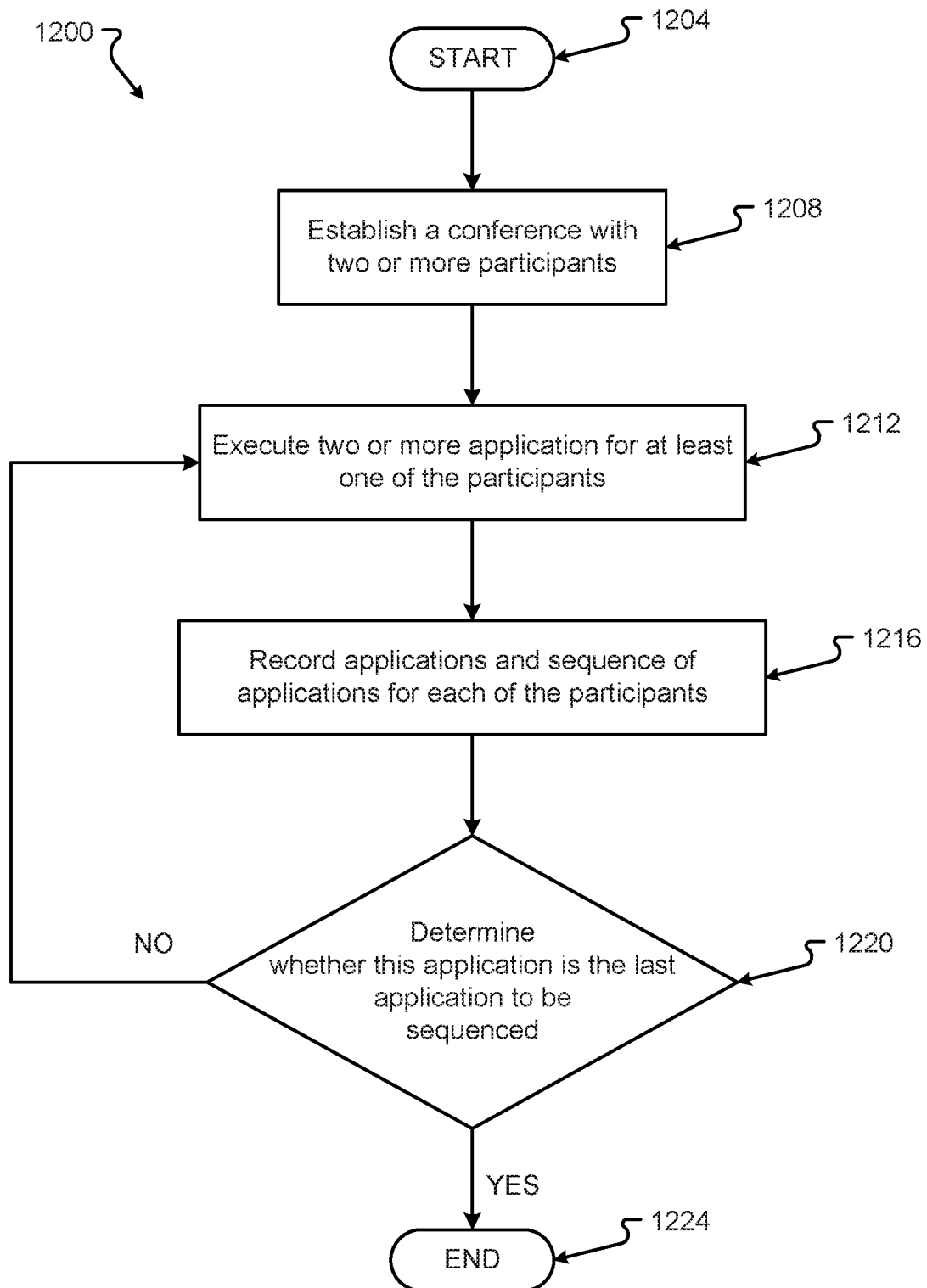
FIG. 12 depicts another flow diagram of an embodiment of a method generally directed to reconstructing application sequencing.

An embodiment of a method 1200 for recording information about application sequence may be as shown in FIG. 12. A general order for the steps of the method 1200 is shown in FIG. 12. Generally, the method 1200 starts with a start operation 1204 and ends with an end operation 1220. The method 1200 can include more or fewer steps or can arrange the order of the steps differently than those shown in FIG. 12. The method 1200 can be executed as a set of computer-executable instructions executed by a computer system and encoded or stored on a computer readable medium. Hereinafter, the method 1200 shall be explained with reference to the systems, components, modules, software, data structures, user interfaces, etc. described in conjunction with FIGS. 1-11.

In step 1208, the SIP conference controller 120 can establish a conference. The established conference may be as described hereinbefore. In establishing the conference, the SIP conference controller 120 may direct the media gateway 132 to execute two or more applications 821, 823 for use during the conference call, in step 1212.

The executed applications 821, 823 and the sequence in which those applications are to be applied may be recorded, in step 1216, in a shared database 900. The SIP conference controller 120 can establish the database 900 with the records 904 for each of the network elements 104. In the record 904 for the conference call, the SIP conference controller 120 can record the application ID 908 and the sequence number 912 for possible later use if the call needs to be reconstructed.

After executing each of several applications 821, 823, the SIP conference controller 120 can determine whether the most recently-executed application is the last application that will be invoked, in step 1220. If the application is the last application, the method 1200 proceeds YES to the end process 1224. However, if the application is not the last application, the method 1200 proceeds NO back to step 1212 where a next application 821, 823 is executed and that application's ID 908 and sequence number 912 are recorded in database 900.

Figure 13:
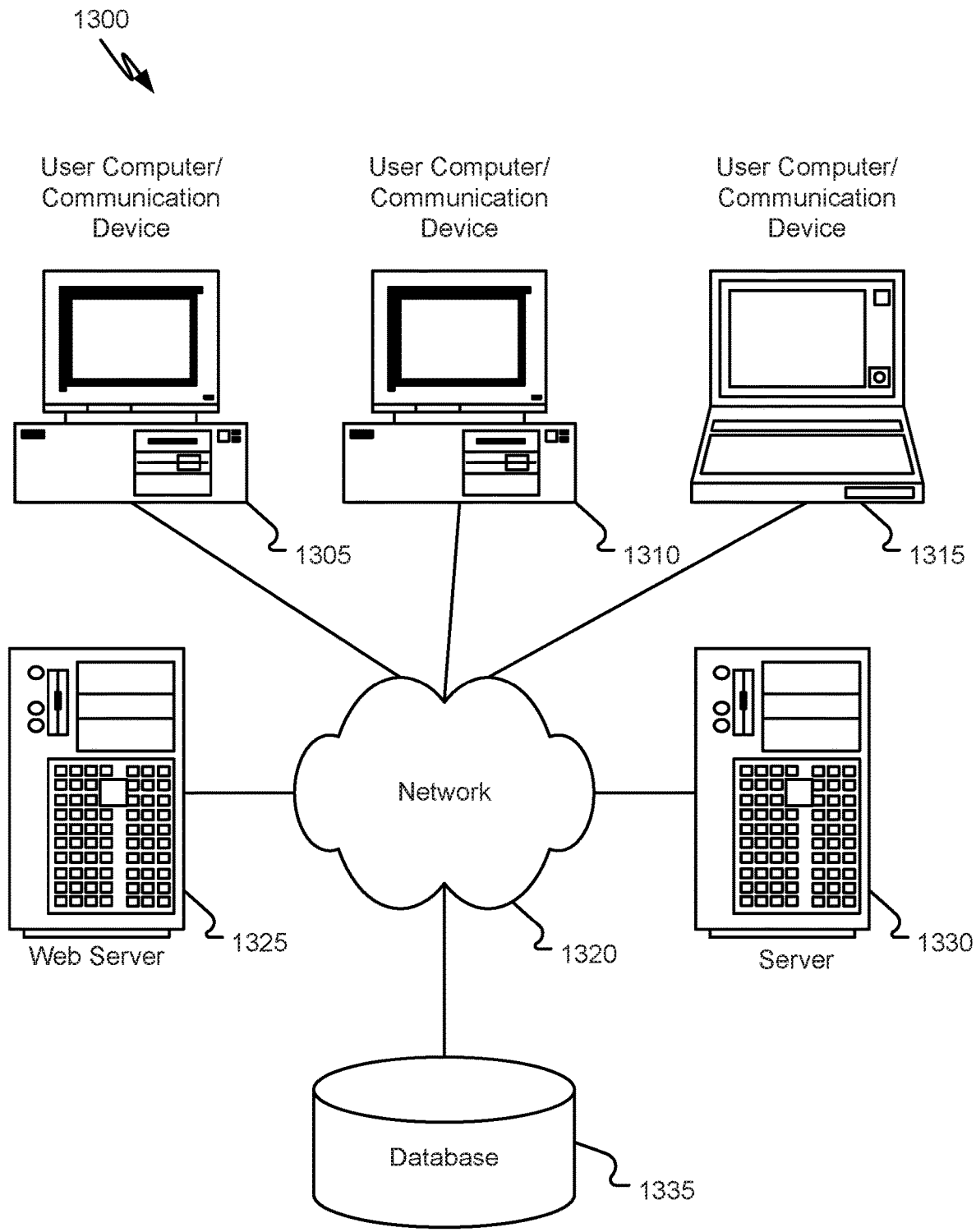
FIG. 13 depicts a block diagram of a computing environment associated with the conference call.

FIG. 13 illustrates a block diagram of a computing environment 1300 that may function as the servers, user computers, or other systems provided and described above. The environment 1300 includes one or more user computers 1305, 1310, and 1315. The user computers 1305, 1310, and 1315 may be general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These user computers 1305, 1310, 1315 may also have any of a variety of applications, including for example, database client and/or server applications, and web browser applications. Alternatively, the user computers 1305, 1310, and 1315 may be any other electronic device, such as a thin-client computer, Internet-enabled mobile telephone, and/or personal digital assistant, capable of communicating via a network 1320 and/or displaying and navigating web pages or other types of electronic documents. Although the exemplary computer environment 1300 is shown with three user computers, any number of user computers may be supported.

Environment 1300 further includes a network 1320. The network 1320 may can be any type of network familiar to those skilled in the art that can support data communications using any of a variety of commercially-available protocols, including without limitation SIP, TCP/IP, SNA, IPX, AppleTalk, and the like. Merely by way of example, the network 1320 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.13 suite of protocols, the Bluetooth® protocol known in the art, and/or any other wireless protocol); and/or any combination of these and/or other networks.

The system may also include one or more server 1325, 1330. In this example, server 1325 is shown as a web server and server 1330 is shown as an application server. The web server 1325, which may be used to process requests for web pages or other electronic documents from user computers 1305, 1310, and 1315. The web server 1325 can be running an operating system including any of those discussed above, as well as any commercially-available server operating systems. The web server 1325 can also run a variety of server applications, including SIP servers, HTTP servers, FTP servers, CGI servers, database servers, Java servers, and the like. In some instances, the web server 1325 may publish operations available operations as one or more web services.

The environment 1300 may also include one or more file and or/application servers 1330, which can, in addition to an operating system, include one or more applications accessible by a client running on one or more of the user computers 1305, 1310, 1315. The server(s) 1330 and/or 1325 may be one or more general purpose computers capable of executing programs or scripts in response to the user computers 1305, 1310 and 1315. As one example, the server 1330, 1325 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1330 may also include database servers, including without limitation those commercially available from Oracle, Microsoft, Sybase™, IBM™ and the like, which can process requests from database clients running on a user computer 1305.

The web pages created by the server 1325 and/or 1330 may be forwarded to a user computer 1305 via a web (file) server 1325, 1330. Similarly, the web server 1325 may be able to receive web page requests, web services invocations, and/or input data from a user computer 1305 and can forward the web page requests and/or input data to the web (application) server 1330. In further embodiments, the web server 1330 may function as a file server. Although for ease of description, FIG. 13 illustrates a separate web server 1325 and file/application server 1330, those skilled in the art will recognize that the functions described with respect to servers 1325, 1330 may be performed by a single server and/or a plurality of specialized servers, depending on implementation-specific needs and parameters. The computer systems 1305, 1310, and 1315, web (file) server 1325 and/or web (application) server 1330 may function as the system, devices, or components described in FIGS. 1-5.

The environment 1300 may also include a database 1335. The database 1335 may reside in a variety of locations. By way of example, database 1335 may reside on a storage medium local to (and/or resident in) one or more of the computers 1305, 1310, 1315, 1325, 1330. Alternatively, it may be remote from any or all of the computers 1305, 1310, 1315, 1325, 1330, and in communication (e.g., via the network 1320) with one or more of these. The database 1335 may reside in a storage-area network ("SAN") familiar to those skilled in the art. Similarly, any necessary files for performing the functions attributed to the computers 1305, 1310, 1315, 1325, 1330 may be stored locally on the respective computer and/or remotely, as appropriate. The database 1335 may be a relational database, such as Oracle 20i®, that is adapted to store, update, and retrieve data in response to SQL-formatted commands.

Figure 14:
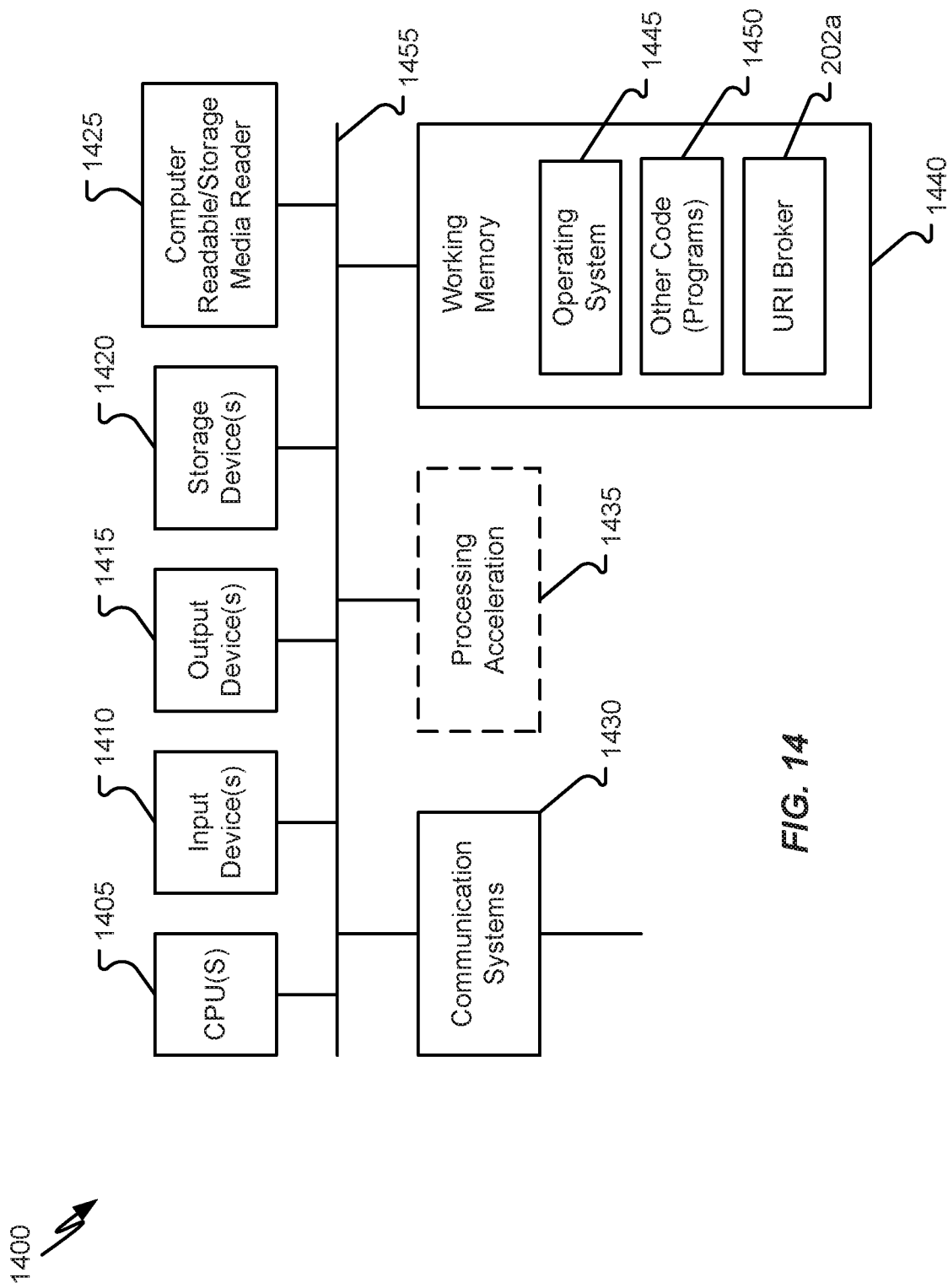
FIG. 14 depicts a block diagram of a computing device associated with one or more components described herein.

FIG. 14 illustrates one embodiment of a computer system 1400 upon which the servers, user computers, or other systems or components described above may be deployed or executed. The computer system 1400 is shown comprising hardware elements that may be electrically coupled via a bus 1455. The hardware elements may include one or more central processing units (CPUs) 1415; one or more input devices 1410 (e.g., a mouse, a keyboard, etc.); and one or more output devices 1415 (e.g., a display device, a printer, etc.). The computer system 1400 may also include one or more storage devices 1420. By way of example, storage device(s) 1420 may be disk drives, optical storage devices, solid-state storage devices such as a random access memory ("RAM") and/or a read-only memory ("ROM"), which can be programmable, flash-updateable and/or the like.

The computer system 1400 may additionally include a computer-readable storage media reader 1425; a communications system 1430 (e.g., a modem, a network card (wireless or wired), an infra-red communication device, etc.); and working memory 1440, which may include RAM and ROM devices as described above. The computer system 1400 may also include a processing acceleration unit 1435, which can include a DSP, a special-purpose processor, and/or the like.

The computer-readable storage media reader 1425 can further be connected to a computer-readable storage medium, together (and, optionally, in combination with storage device(s) 1420) comprehensively representing remote, local, fixed, and/or removable storage devices plus storage media for temporarily and/or more permanently containing computer-readable information. The communications system 1430 may permit data to be exchanged with a network and/or any other computer described above with respect to the computer environment 2000. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1400 may also comprise software elements, shown as being currently located within a working memory 1440, including an operating system 1445 and/or other code 1450. It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1405 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to routing of vehicles within an environment. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others. The present disclosure can provide a number of advantages depending on the particular configuration. For example, the system allows for the automated adjustment of routes intersecting the travel route of an emergency vehicle. The rerouting ensures faster response times for the emergency vehicles and prevents possible accidents with the emergency vehicles. Further, the systems and methods expand the type of information that may be provided in map and guidance software. Now, real time emergencies are identified for drivers. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 202(f) and/or Section 202, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a media gateway including:
a processor; and
a memory including one or more instructions that when executed by the processor, enable the media gateway to:
determine that a signaling-disrupting event has occurred during a Session Initiation Protocol (SIP) conference call;
reestablish a SIP dialog between a network element and the media gateway; and
re-initiate two or more applications providing features for the SIP conference call, wherein the two or more applications are associated with a sequence order, and wherein the two or more applications are re-initiated such that the sequence order is maintained.

2. The system of claim 1, wherein the network element receives a SIP message including a P-HA-Reconstruction-Snapins header, and wherein the P-HA-ReconstructionSnapins header includes a list of the two or more applications included in the SIP conference call and the sequence order for the two or more applications.

3. The system of claim 2, wherein a first application receives the SIP message and, in response to receiving the SIP message, becomes a high availability controller (HAC), and wherein the HAC generates a list of other applications to be re-initiated.

4. The system according to claim 3, wherein the HAC sends a SIP message to each application preceding the HAC in the sequence order, wherein each SIP message is sent to each application of the two or more applications preceding the HAC in reverse of the sequence order, wherein the HAC sends a SIP message to each application of the two or more applications following the HAC in the sequence order, and wherein each SIP message is sent to each application of the two or more applications following the HAC in a same order as the sequence order.

5. The system according to claim 1, wherein a list of the two or more applications and the sequence order are saved in a shared data during creation of the SIP conference call, and wherein the media gateway retrieves the list of the two or more applications and the sequence order from the shared data during SIP conference call reconstruction.

6. A machine readable memory having stored thereon instructions that cause a processor to execute a method, the instructions comprising:
an instruction to establish a Session Initiation Protocol (SIP) dialog between a SIP user agent and a media gateway;
an instruction to determine that a signaling-disrupting event has occurred during a SIP conference call having the established SIP dialog;
an instruction to reestablish the SIP dialog between the SIP user agent and the media gateway; and
an instruction to re-initiate two or more applications providing features for the SIP conference call, wherein the two or more applications are associated with a sequence order, and wherein the two or more applications are re-initiated such that the sequence order is maintained.

7. The machine readable memory of claim 6, wherein the SIP user agent receives a SIP message including a P-HA-ReconstructionSnapins header, wherein the P-HA-ReconstructionSnapins header includes a list of the two or more applications included in the SIP conference call and the sequence order for the two or more applications.

8. The machine readable memory of claim 7, wherein a first application receives the SIP message and, in response to receiving the SIP message, becomes a high availability controller (HAC), and wherein the HAC generates a list of other applications to be re-initiated.

9. The machine readable memory according to claim 8, wherein the HAC sends a SIP message to each application of the two or more applications preceding the HAC in the sequence order, wherein each SIP message is sent to each application of the two or more applications preceding the HAC in reverse of the sequence order, wherein the HAC sends a SIP message to each application of the two or more applications following the HAC in the sequence order, and wherein each SIP message is sent to each application of the two or more applications following the HAC in a same order as the sequence order.

10. The machine readable memory according to claim 6, wherein a list of two or more applications and the sequence order are saved in a shared data during creation of the SIP conference call, and wherein the media gateway retrieves the list of the two or more applications and the sequence order from the shared data during SIP conference call reconstruction.

11. A method of managing a Session Initiation Protocol (SIP) dialog between a media gateway and one or more network elements, the method comprising:
determining that a signaling-disrupting event has occurred during a SIP conference call;
reestablishing the SIP dialog between the one or more network elements and the media gateway; and
re-initiating two or more applications, wherein the two or more applications provide features for the SIP conference call, wherein the two or more applications are associated with a sequence order, and wherein the two or more applications are re-initiated such that the sequence order is maintained.

12. The method according to claim 11, wherein re-initiating the two or more applications includes: receiving at the one or more network elements, a SIP message including a P-HA-ReconstructionSnapins header, wherein the P-HA-ReconstructionSnapins header includes a list of the two or more applications included in the SIP conference call and sequence order for the two or more applications.

13. The method according to claim 12, wherein a first application receives the SIP message.

14. The method according to claim 13, further comprising in response to receiving the SIP message, the first application becoming a high availability controller (HAC).

15. The method according to claim 14, further comprising the HAC generating a list of other applications to be re-initiated.

16. The method according to claim 15, further comprising the HAC sending a SIP message to each application of the two or more applications preceding the HAC in the sequence order, wherein each SIP message is sent to each application of the two or more applications proceeding the HAC in reverse of the sequence order.

17. The method according to claim 15, further comprising the HAC sending a SIP message to each application of the two or more applications following the HAC in the sequence order, wherein each SIP message is sent to each application of the two or more applications following the HAC in a same order as the sequence order.

18. The method according to claim 11, wherein a list of the two or more applications and the sequence order are saved in a shared data during creation of the SIP conference call.

19. The method according to claim 18, further comprising the media gateway retrieving the list of the two or more applications and the sequence order from the shared data during SIP conference call reconstruction.

20. The method according to claim 11, further comprising creating a container associated with at least one of the one or more network elements, wherein the two or more applications are associated with the container in the SIP conference call.

* * * * *